United States Patent
Jung et al.

(10) Patent No.: US 12,018,947 B2
(45) Date of Patent: Jun. 25, 2024

(54) METHOD FOR PROVIDING NAVIGATION SERVICE USING MOBILE TERMINAL, AND MOBILE TERMINAL

(71) Applicant: LG ELECTRONICS INC., Seoul (KR)

(72) Inventors: Dukyung Jung, Seoul (KR); Sunghwan Choi, Seoul (KR)

(73) Assignee: LG Electronics Inc., Seoul (KR)

(*) Notice: Subject to any disclaimer, the term of this patent is extended or adjusted under 35 U.S.C. 154(b) by 219 days.

(21) Appl. No.: 17/440,933

(22) PCT Filed: Mar. 20, 2020

(86) PCT No.: PCT/KR2020/003849
§ 371 (c)(1),
(2) Date: Sep. 20, 2021

(87) PCT Pub. No.: WO2020/190082
PCT Pub. Date: Sep. 24, 2020

(65) Prior Publication Data
US 2022/0163334 A1    May 26, 2022

Related U.S. Application Data

(60) Provisional application No. 62/821,400, filed on Mar. 20, 2019.

(51) Int. Cl.
*G01C 21/34* (2006.01)
*G01C 21/36* (2006.01)
(Continued)

(52) U.S. Cl.
CPC ..... *G01C 21/3423* (2013.01); *G01C 21/3647* (2013.01); *G01S 19/42* (2013.01); *H04W 4/024* (2018.02)

(58) Field of Classification Search
CPC .......... G01C 21/3423; G01C 21/3647; H04W 4/024; G01S 19/42
See application file for complete search history.

(56) References Cited

U.S. PATENT DOCUMENTS 9,438,948 B1 * 9/2016 Ryu ................. H04N 21/41422
2015/0024786 A1 * 1/2015 Asrani ................. H04W 4/023
455/552.1

(Continued)

FOREIGN PATENT DOCUMENTS

CN     109086277 A  * 12/2018
JP     2002328042 A * 11/2002
(Continued)

OTHER PUBLICATIONS

English translation of JP-2002328042-A (Year: 2002).*
(Continued)

*Primary Examiner* — Anshul Sood
*Assistant Examiner* — Matthew Ho
(74) *Attorney, Agent, or Firm* — Fish & Richardson P.C.

(57) ABSTRACT

Disclosed is a method for providing a navigation service by a mobile terminal. According to the present specification, when there is at least one mode change section in which a navigation mode needs to be changed in a discovered path, map data, which serves as a basis for path guidance, is changed from first map data to second map data when entering the mode change section, and thus the navigation service can be successively provided in the changed navigation mode. Accordingly, by inputting a destination once, it is possible to implement a seamless path guidance service using a mobile even in an environment in which a vehicle cannot enter.

2 Claims, 19 Drawing Sheets

(51) Int. Cl.
    *G01S 19/42*     (2010.01)
    *H04W 4/024*    (2018.01)

(56) References Cited

U.S. PATENT DOCUMENTS

2015/0081218 A1    3/2015   Pang et al.
2016/0138926 A1*   5/2016   Annapureddy .... G01C 21/3423
                                                      701/467

FOREIGN PATENT DOCUMENTS

| JP | 2013217808 A | * | 10/2013 |
| JP | 2016183936 A | * | 10/2016 |
| KR | 20150137799 |   | 12/2015 |
| KR | 20160016627 |   | 2/2016 |
| KR | 20180075843 A |   | 7/2018 |

OTHER PUBLICATIONS

English translation of CN-109086277-A (Year: 2018).*
English translation of JP-2013217808-A (Year: 2013).*
English translation of JP-2016183936-A (Year: 2016).*
PCT International Search Report in International Appln. No. PCT/KR2020/003849, dated Jul. 16, 2020, 5 pages.

\* cited by examiner

[FIG. 1]
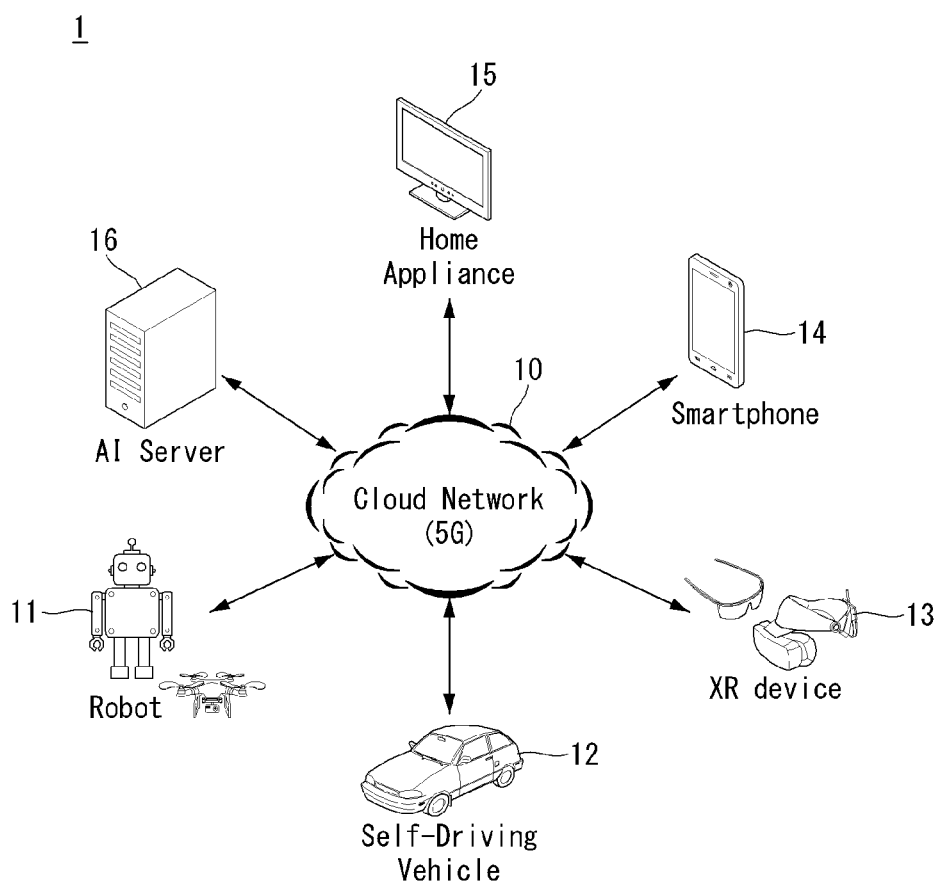

[FIG. 2]
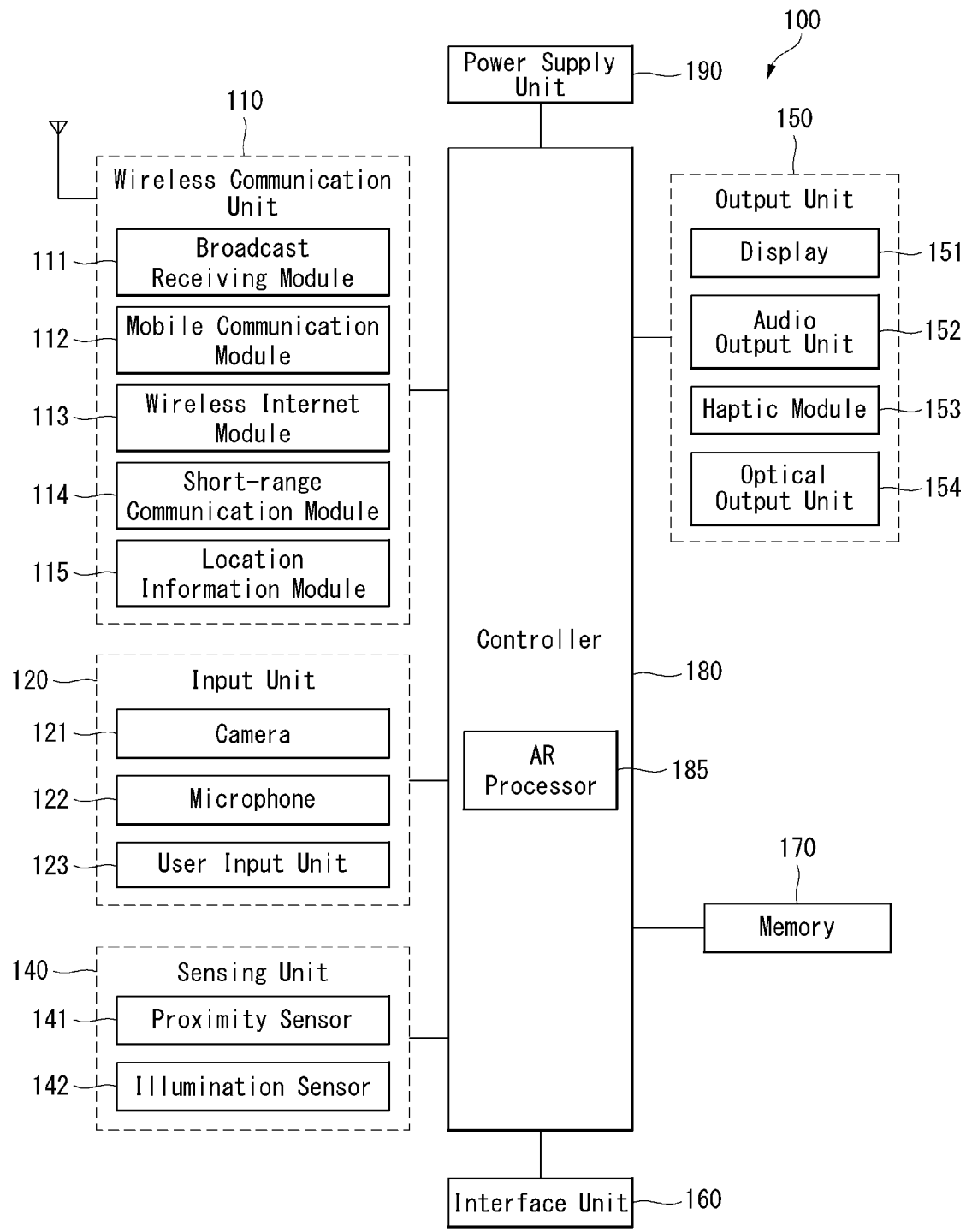

[FIG. 3]
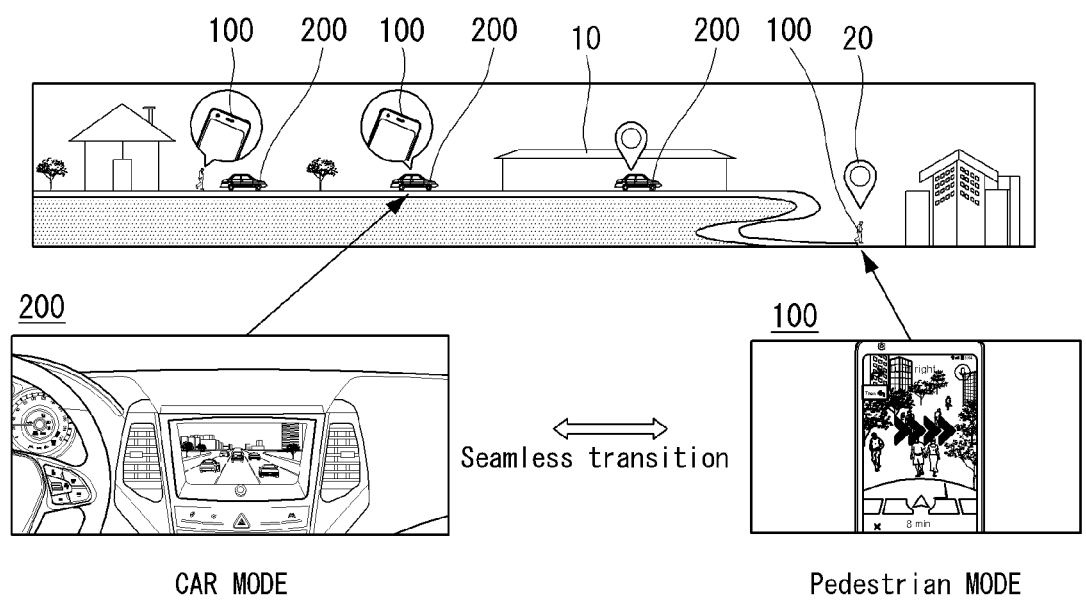

[FIG. 4]
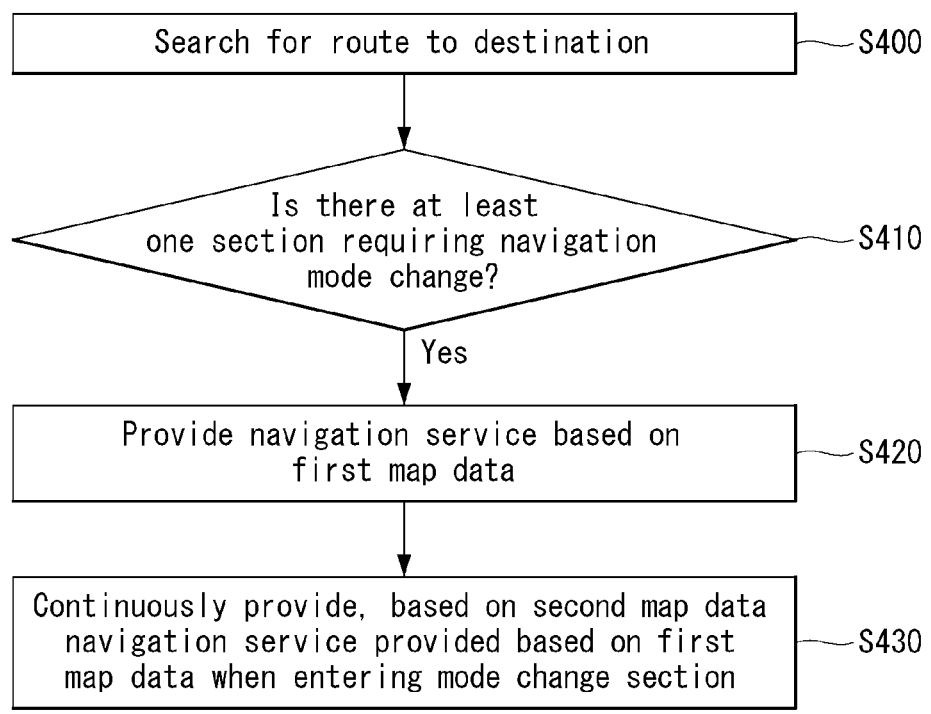

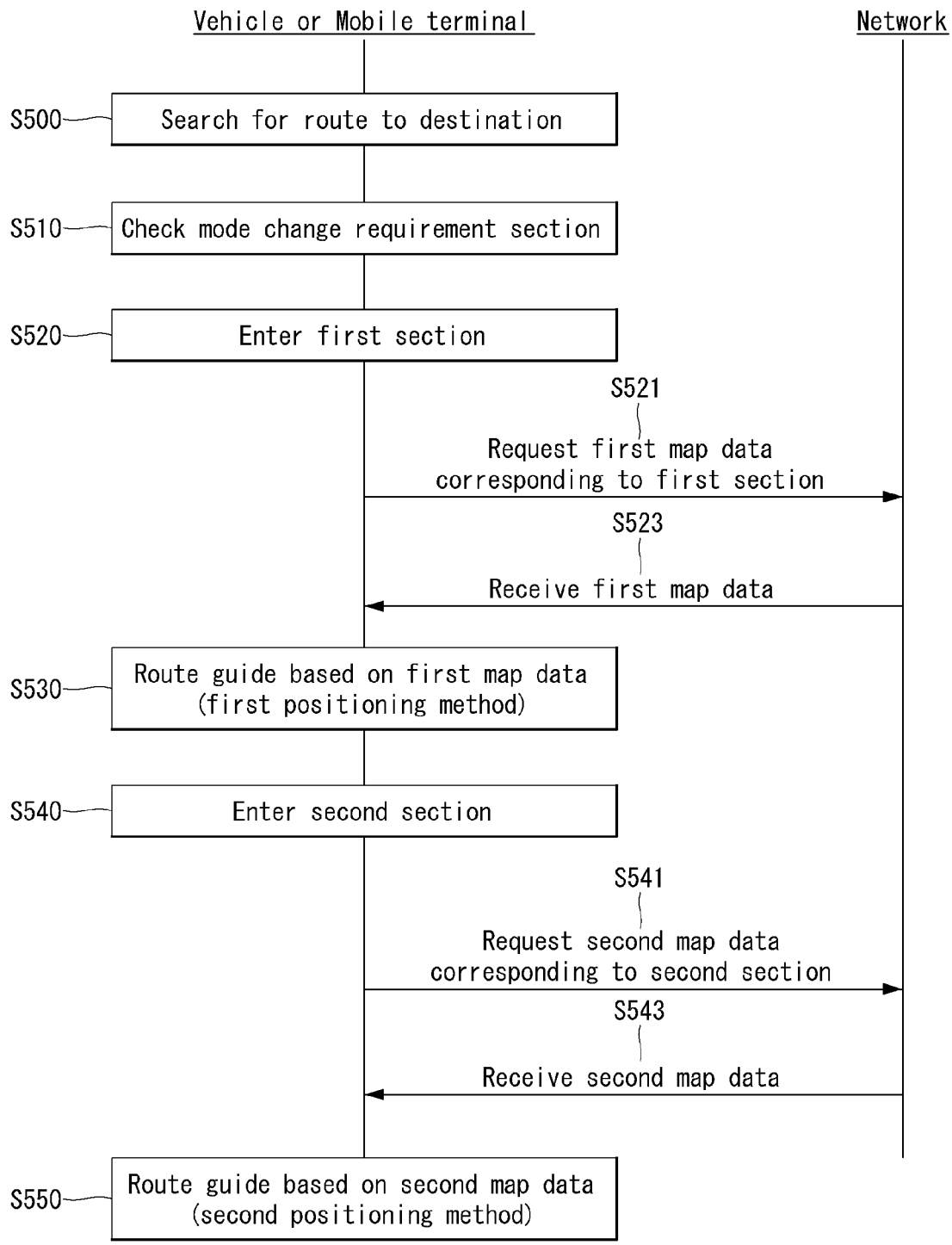
[FIG. 5]

[FIG. 6]
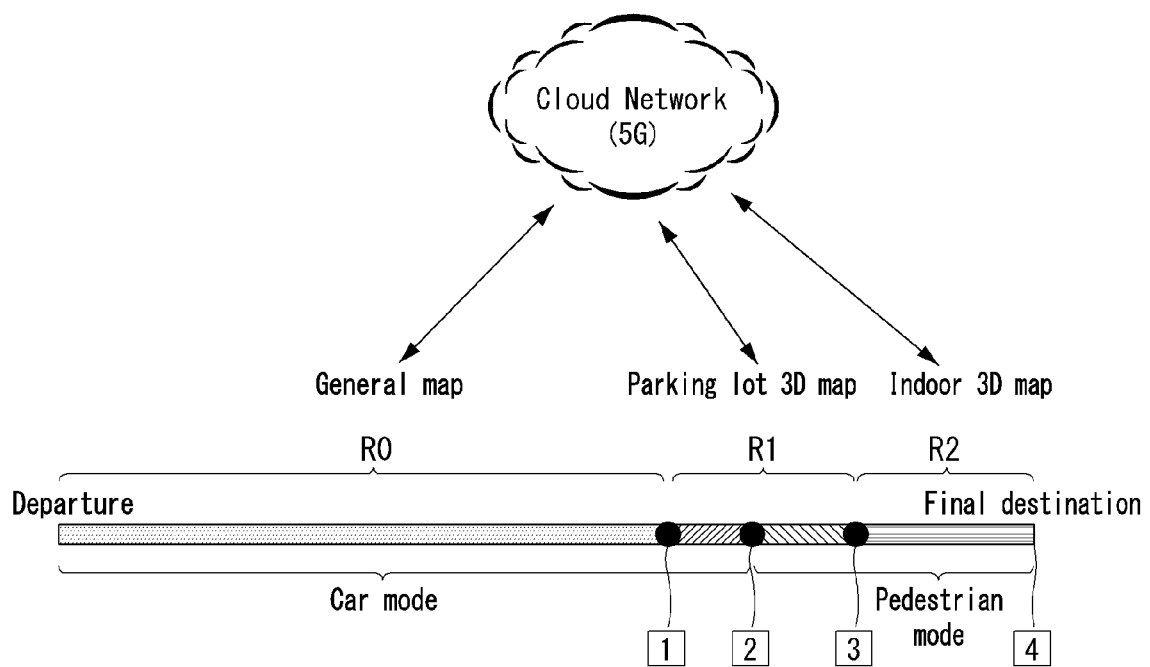

[FIG. 7]
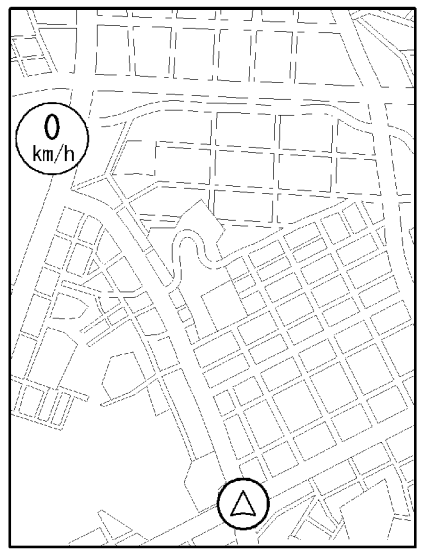
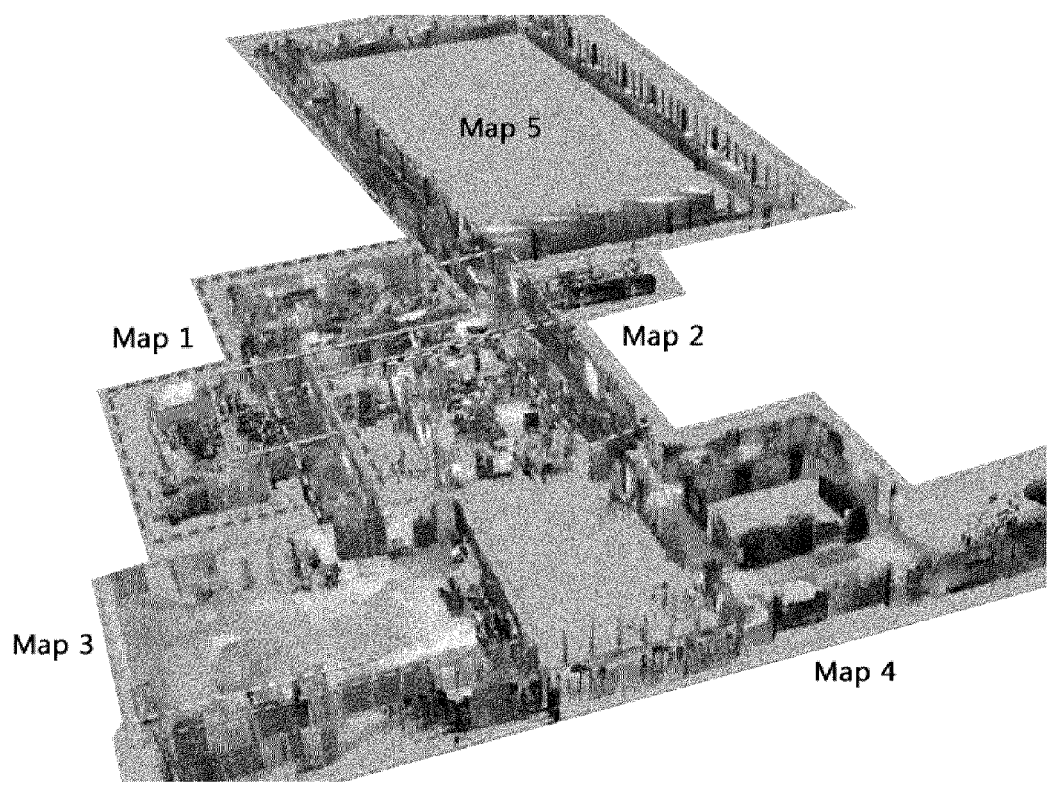

[FIG. 8]
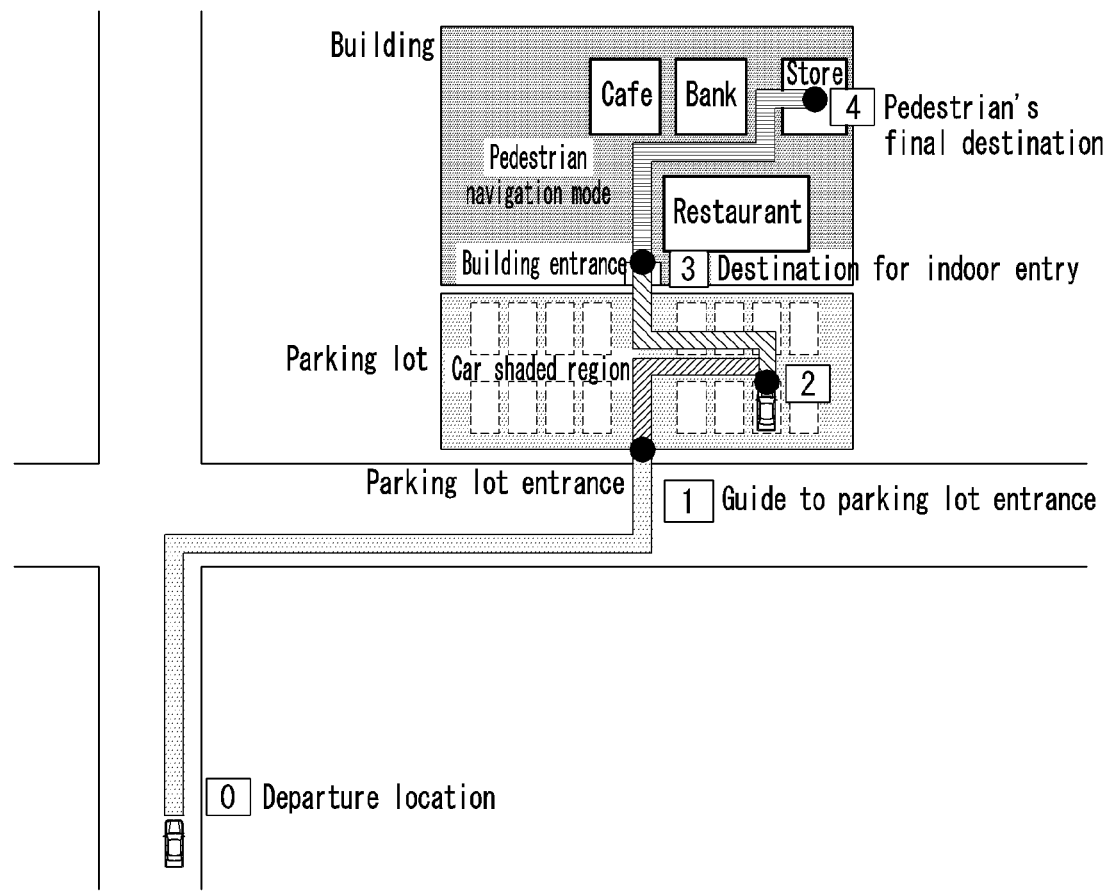

[FIG. 9]
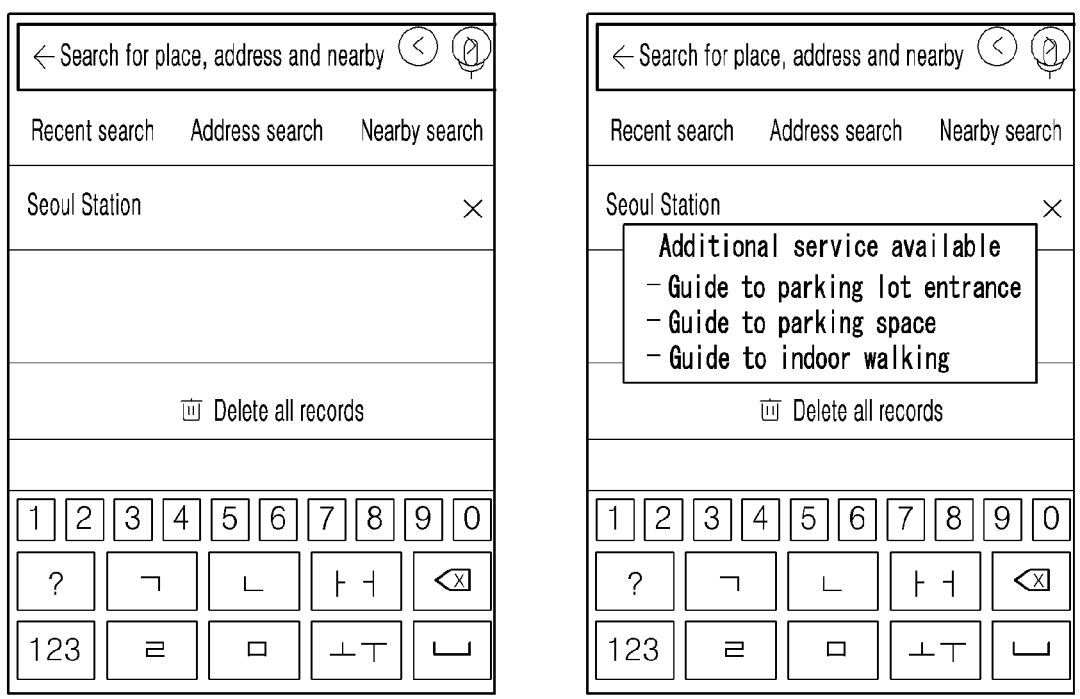

[FIG. 10]
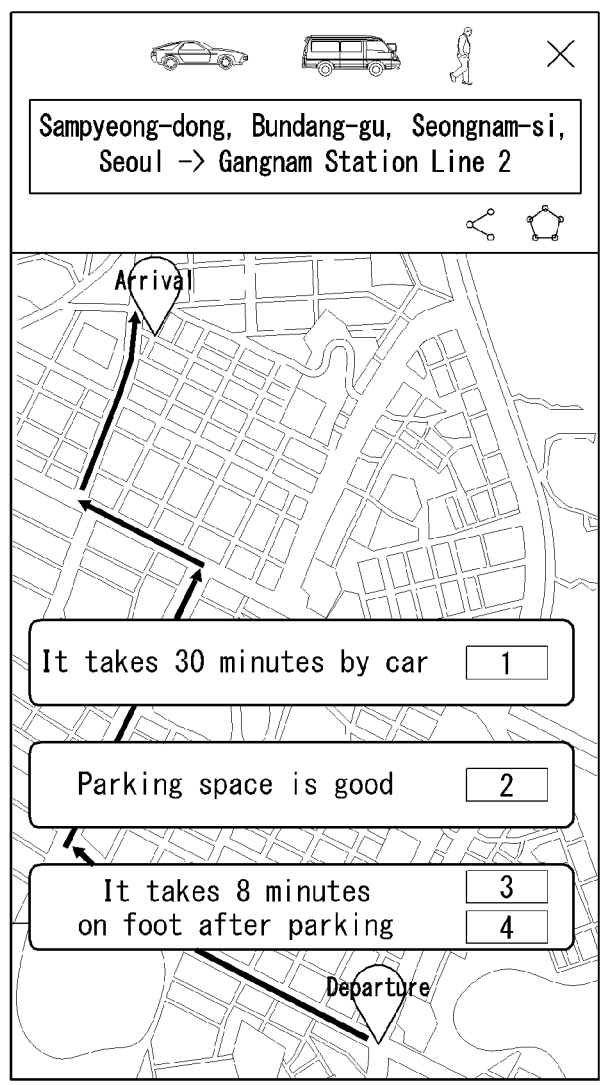

[FIG. 11]
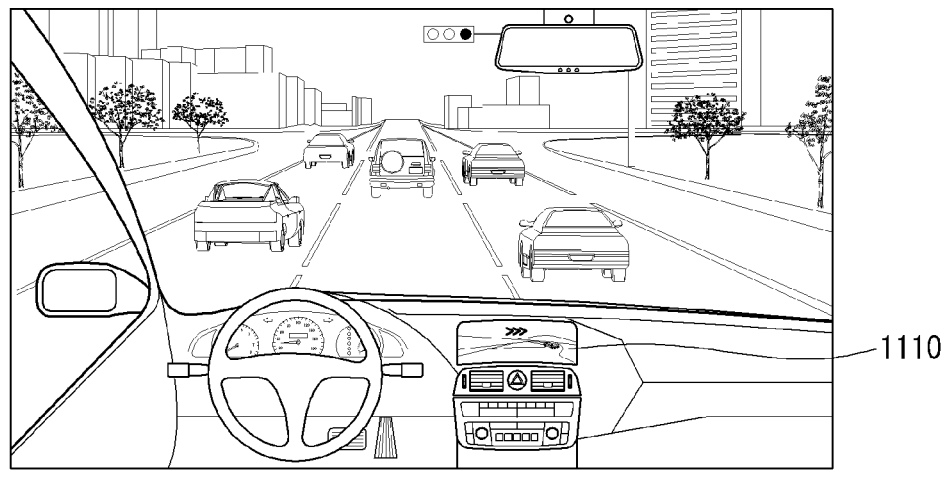
(a)
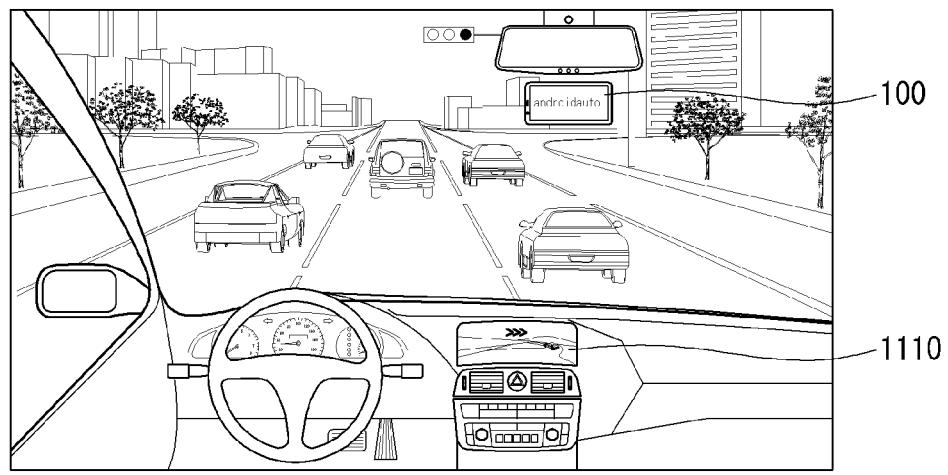
(b)

[FIG. 12A]
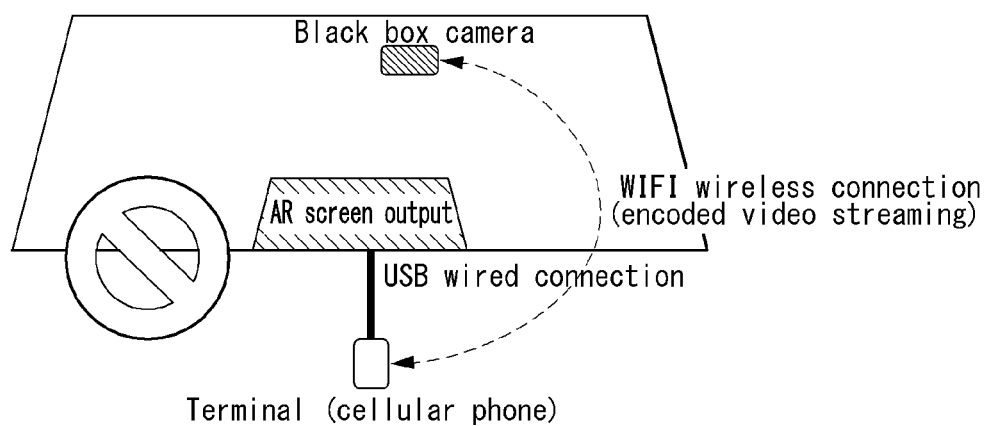
[FIG. 12B]
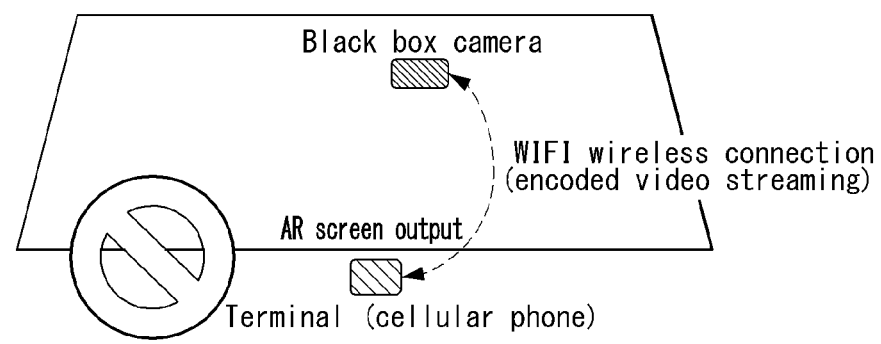

[FIG. 12C]
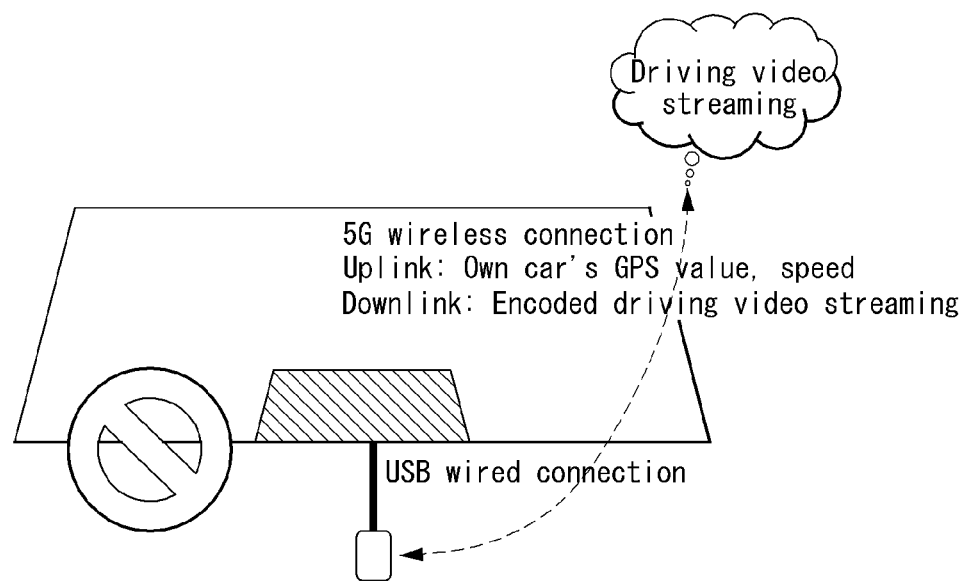
[FIG. 12D]
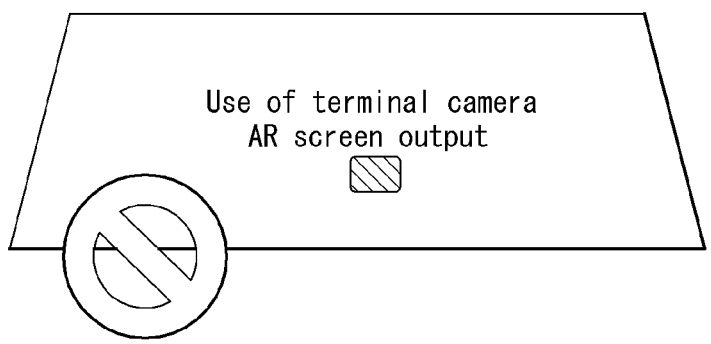

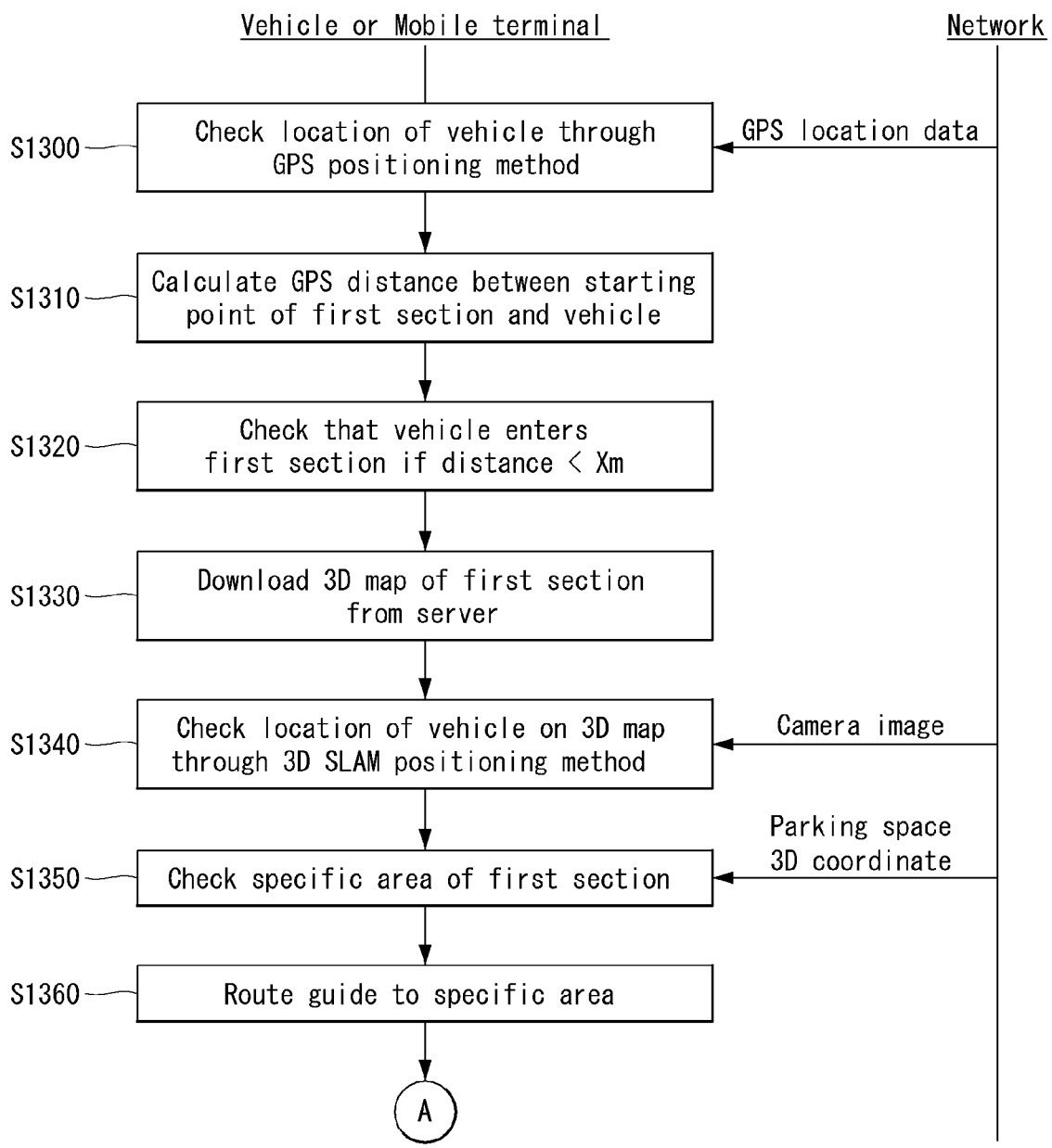
[FIG. 13]

[FIG. 14]
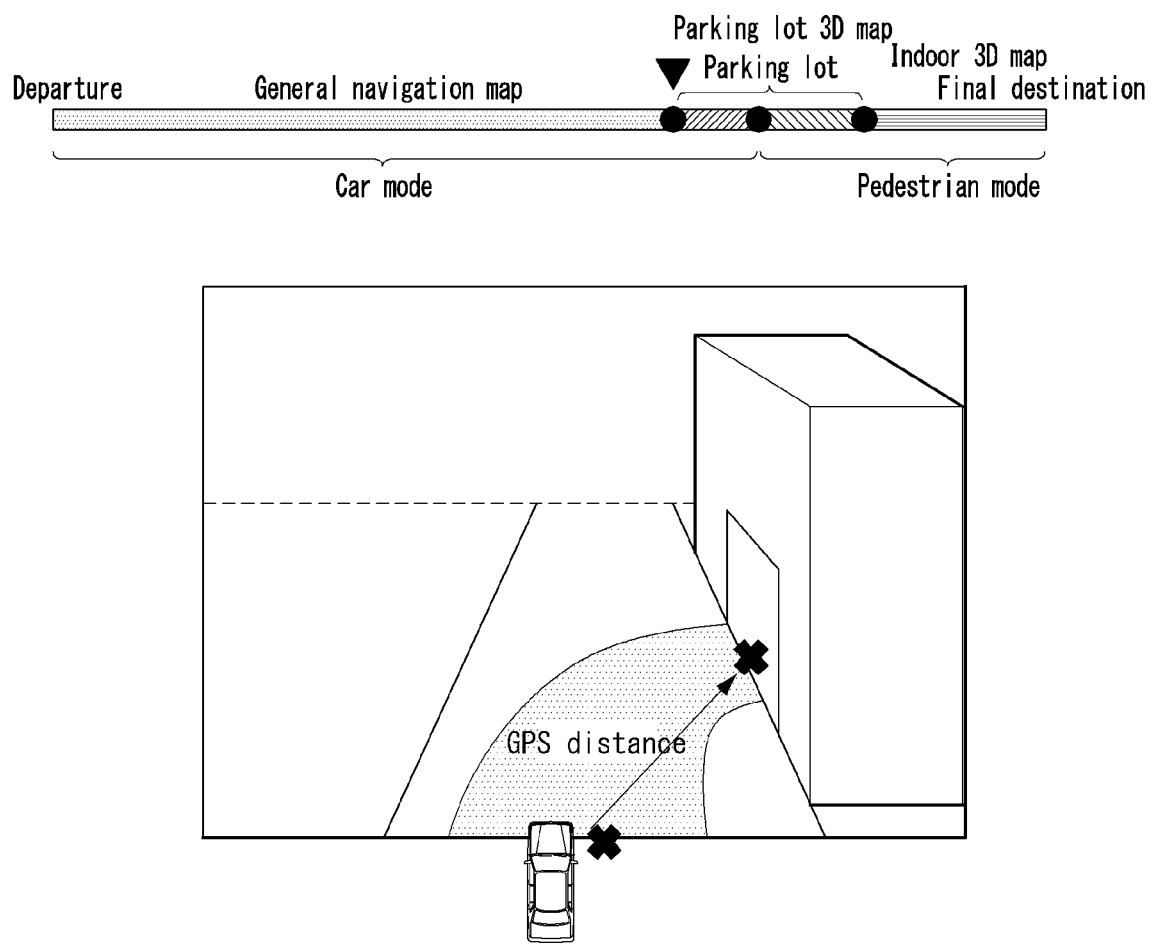

[FIG. 15]
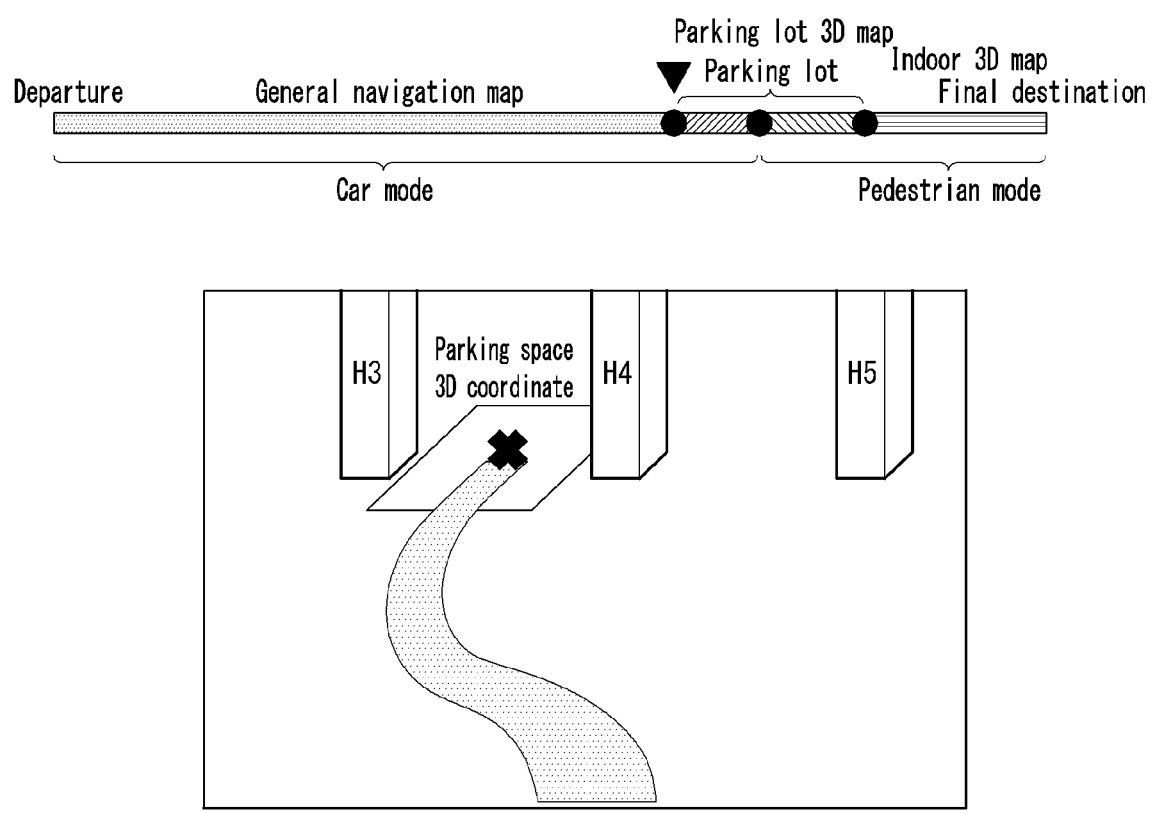

[FIG. 16]
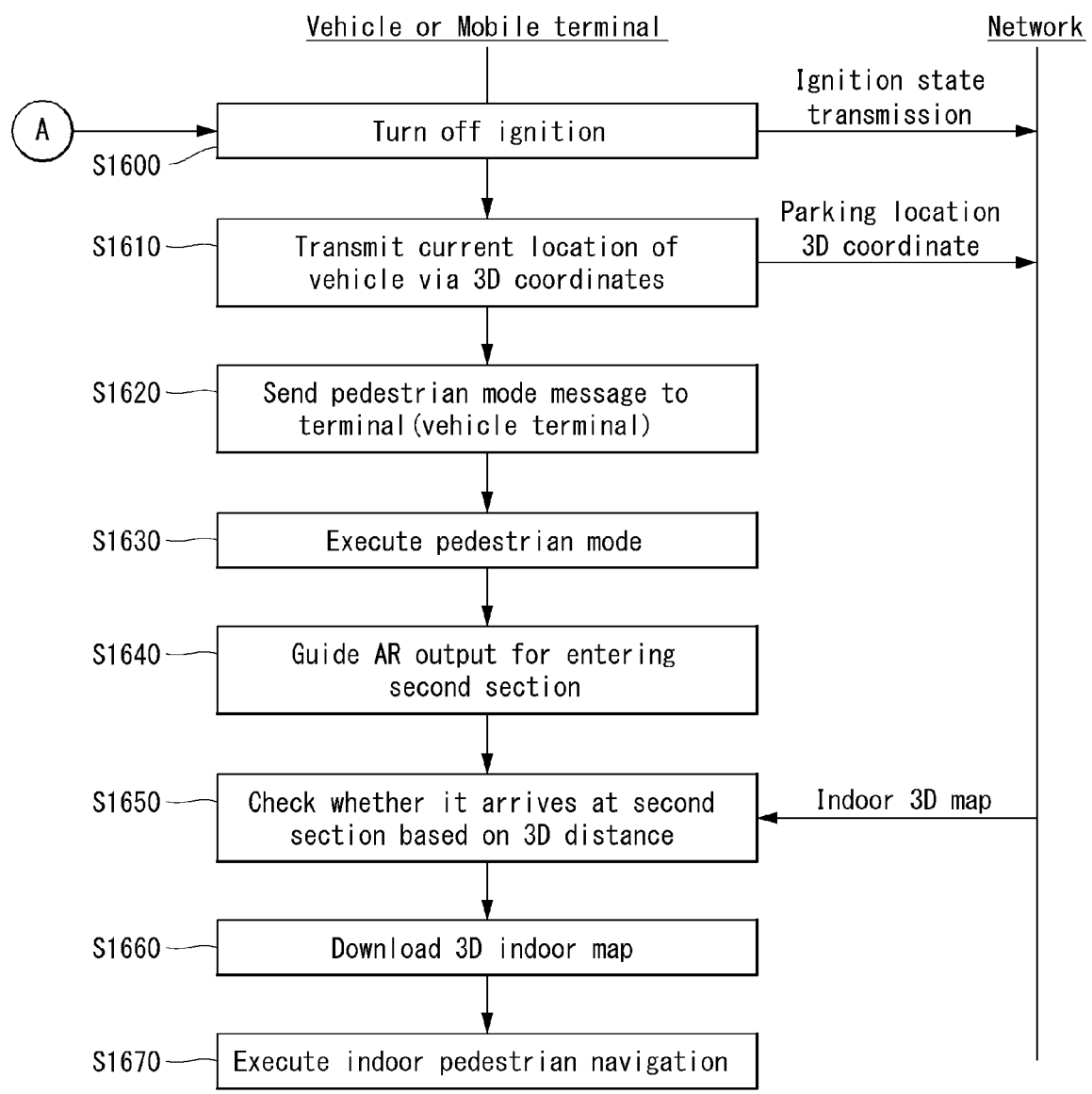

[FIG. 17]
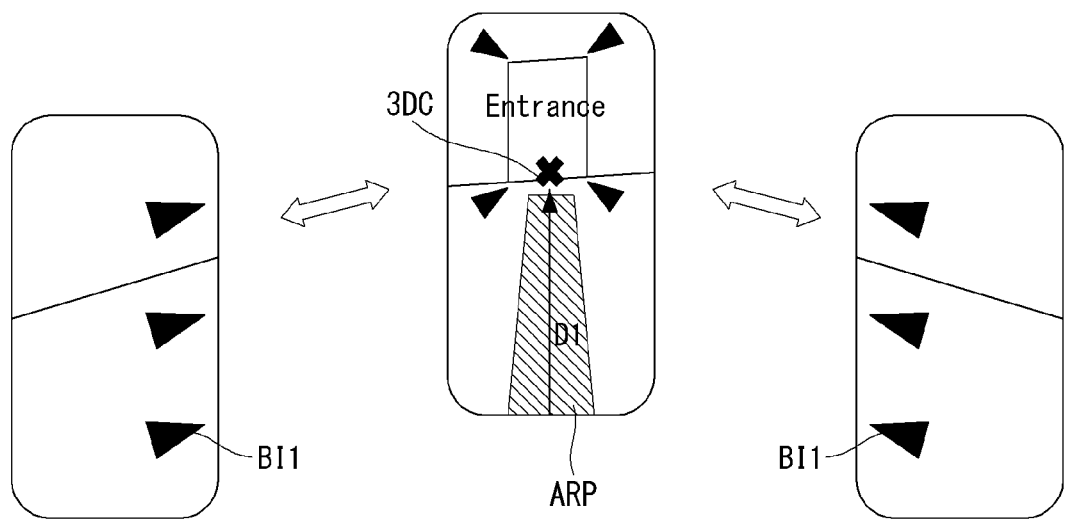

[FIG. 18]
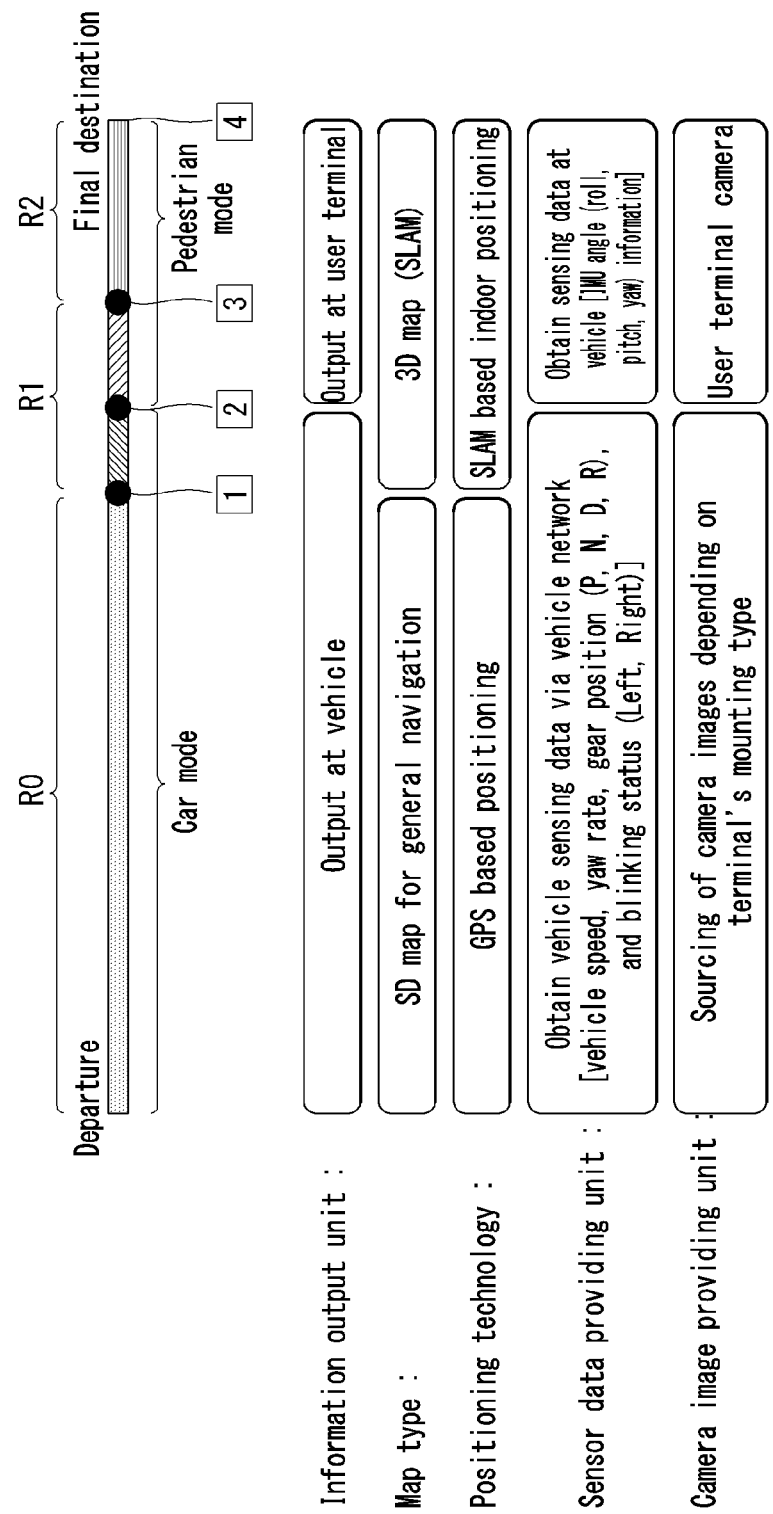

METHOD FOR PROVIDING NAVIGATION SERVICE USING MOBILE TERMINAL, AND MOBILE TERMINAL

CROSS-REFERENCE TO RELATED APPLICATIONS

This application is the National Stage filing under 35 U.S.C. 371 of International Application No. PCT/KR2020/003849, filed on Mar. 20, 2020, which claims the benefit of U.S. Provisional Application No. 62/821,400, filed on Mar. 20, 2019, the contents of which are all hereby incorporated by reference herein in their entirety.

TECHNICAL FIELD

The present disclosure relates to a method of providing a navigation service using a mobile terminal.

BACKGROUND ART

Vehicles may be classified into internal combustion engine vehicles, external combustion engine vehicles, gas turbine vehicles, or electric vehicles, etc. depending on how they are powered.

Recently, smart vehicles are being actively developed for the safety and convenience of drivers and pedestrians, and research on sensors mounted on intelligent vehicles is being actively conducted. Cameras, infrared sensors, radars, GPS, lidars, gyroscopes, etc. are being used in intelligent vehicles, and the cameras among them serve as the human eyes.

With the development of various sensors and electronic devices, vehicles with a driving assistance function that assists the occupant' driving and improves driving safety and convenience are attracting attention.

A navigation function provided by the vehicle may guide a route to the destination through a navigation included in the vehicle. However, if a destination is a location where the vehicle cannot enter, a driver must perform a new task to receive a route guide service to a final destination after getting off the vehicle.

DISCLOSURE

Technical Problem

An object of the present disclosure is to address the above-described and other needs and/or problems.

Another object of the present disclosure is to provide a navigation service method using a mobile terminal capable of seamlessly providing a navigation service through a vehicle and a mobile.

Another object of the present disclosure is to provide a navigation service method using a mobile terminal capable of seamlessly maintaining a switch between a vehicle mode and a mobile mode when a section that a vehicle cannot enter exists in a route guide section.

Another object of the present disclosure is to provide a navigation service method using a mobile terminal capable of more efficiently performing a route guide to a final destination by extending a navigation mode from a vehicle mode to a mobile mode through one destination setting.

Technical Solution

In one aspect of the present disclosure, there is provided a method of providing a navigation service in a mobile terminal, the method comprising searching for a route to a destination; determining whether there is at least one mode change section requiring a change of a navigation mode among the searched route; and when it is determined that it enters the mode change section, changing map data underlying a route guide from first map data to second map data to continuously provide the navigation service in the changed navigation mode.

According to an embodiment, determining whether there is at least one mode change section may comprises determining whether there is, among the searched route, at least one section requiring the route guide based on the map data configured through different positioning methods.

According to an embodiment, the map data may include at least one of map data configured through a GPS positioning technology and map data configured through a SLAM positioning technology.

According to an embodiment, the method may further comprise, when it is determined that it enters a first section of the at least one section while providing the navigation service based on the first map data, guiding a route to the destination based on the second map data without a resetting operation of the destination.

According to an embodiment, the method may further comprise, when a distance between a current location of the mobile terminal and a starting point of the first section is less than or equal to a predetermined distance, determining that it enters the first section.

According to an embodiment, the first map data may be map data configured through a GPS positioning technology, and the method may further comprise, when a current location of the mobile terminal enters the first section, downloading the second map data through a wireless communication unit.

According to an embodiment, the method may further comprise, when the current location of the mobile terminal and a starting point of the first section enter within a predetermined distance, determining that it enters the first section.

According to an embodiment, the navigation mode may include at least one of a first mode in which a navigation screen is provided through at least one vehicle display, and a second mode in which the navigation screen is provided through a display of the mobile terminal.

According to an embodiment, when a predetermined condition is satisfied, the first mode may be switched to the second mode, or the second mode is switched to the first mode. In a state in which the navigation service is continuously performed, a switch between the first mode and the second mode may be performed.

According to an embodiment, a predetermined condition may be determined by a combination of at least one of vehicle sensor data and sensor data of the mobile terminal, and the method may further comprise determining whether a vehicle is stopped, and whether there is a movement of the mobile terminal to the inside or outside of the vehicle while the vehicle is stopped.

According to an embodiment, the first mode may provide the navigation screen displayed on the mobile terminal on the vehicle display as a mirroring screen.

According to an embodiment, the method may further comprise determining that it enters the mode change section based on at least one of vehicle sensor data or sensor data of the mobile terminal received through a wireless communication unit.

According to an embodiment, the method may further comprise obtaining an image for configuring a navigation screen through at least one camera; generating an AR image by mapping AR information to the image; and providing the navigation service in an AR mode.

According to an embodiment, the camera may include at least one of at least one camera included in the mobile terminal and at least one camera included in a vehicle.

According to an embodiment, an image may include a driving streaming video received from a network through a wireless communication unit.

According to an embodiment, the first map data may be map data stored in a memory of the mobile terminal, and the second map data may be map data for providing the navigation service in an indoor space.

According to an embodiment, the method may further comprise, when the destination is input, displaying, on a display, an available service menu according to the change of the navigation mode; and providing navigation service summary information for each mode change section.

In another aspect of the present disclosure, there is provided a mobile terminal comprising a wireless communication unit; a memory configured to store map data; an input unit configured to receive a destination; and a processor configured to search for a route to the destination, determine whether there is at least one mode change section requiring a change of a navigation mode among the searched route, and when it is determined that it enters the mode change section, change map data underlying a route guide from first map data to second map data to continuously provide the navigation service in the changed navigation mode.

In another aspect of the present disclosure, there is provided an intelligent device providing a navigation function comprising a wireless communication unit; an input unit; a sensing unit including at least one sensor; a processor; and a memory including commands executable by the processor, wherein the commands are configured to search for a route to a destination, determine whether there is at least one mode change section requiring a change of a navigation mode among the searched route, and when it is determined that it enters the mode change section, change map data underlying a route guide from first map data to second map data to continuously provide the navigation service in the changed navigation mode.

Advantageous Effects

Effects of a method of providing a navigation service using a mobile terminal according to the present disclosure and the mobile terminal are described as follows.

The present disclosure can seamlessly provide a navigation service through a vehicle and mobile.

The present disclosure can seamlessly maintain a switch between a vehicle mode and a mobile mode when a section that a vehicle cannot enter exists in a route guide section.

The present disclosure can more efficiently perform a route guide to a final destination by extending a navigation mode from a vehicle mode to a mobile mode through one destination setting.

DESCRIPTION OF DRAWINGS

FIG. 1 illustrates a system to which the present disclosure is applicable.

FIG. 2 is a block diagram illustrating a mobile terminal related to the present disclosure.

FIG. 3 is a concept diagram illustrating a seamless navigation service described in the present disclosure.

FIG. 4 is a flow chart illustrating a method of providing a navigation service of a mobile terminal according to an embodiment of the present disclosure.

FIG. 5 is a flow chart illustrating a method of providing a navigation service while changing a navigation mode in accordance with an embodiment of the present disclosure.

FIG. 6 is an example diagram for illustrating a mode change requirement section in accordance with an embodiment of the present disclosure.

FIG. 7 illustrates an example of map data used in a mode change requirement section in accordance with an embodiment of the present disclosure.

FIG. 8 is a concept diagram illustrating a seamless navigation service using a mobile terminal in accordance with an embodiment of the present disclosure.

FIGS. 9 and 10 are example diagrams for setting a navigation service using a mobile terminal in accordance with an embodiment of the present disclosure.

FIGS. 11 and 12 illustrate an example of providing an AR navigation screen in accordance with an embodiment of the present disclosure.

FIGS. 13 to 15 illustrate a method of providing a navigation service using a mobile terminal in accordance with an embodiment of the present disclosure when a vehicle enters the parking lot as illustrated in FIG. 8.

FIGS. 16 and 17 illustrate a method of providing a navigation service using a mobile terminal in accordance with an embodiment of the present disclosure when a vehicle enters an indoor building as illustrated in FIG. 8.

FIG. 18 illustrates an output of a navigation screen according to a navigation service using a mobile terminal considering sensing information in accordance with an embodiment of the present disclosure.

MODE FOR INVENTION

Reference will now be made in detail to embodiments of the present disclosure, examples of which are illustrated in the accompanying drawings. Wherever possible, the same reference numbers will be used throughout the drawings to refer to the same or like parts.

It should be understood that when a component is described as being "connected to" or "coupled to" other component, it may be directly connected or coupled to the other component or intervening component(s) may be present.

It will be noted that a detailed description of known arts will be omitted if it is determined that the detailed description of the known arts can obscure embodiments of the present disclosure. The accompanying drawings are used to help easily understand various technical features and it should be understood that embodiments presented herein are not limited by the accompanying drawings. As such, the present disclosure should be understood to extend to any alterations, equivalents and substitutes in addition to those which are particularly set out in the accompanying drawings.

[5G Scenario]

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use cases may focus on only one key performance indicator (KPI). 5G supports these various use cases in a flexible and reliable method.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity in which they are always turned on in order to push real-time information and notification to a user. A cloud storage and application suddenly increases in the mobile communication platform, and this can be applied to both business and entertainment. Furthermore, the cloud storage is a special use case that tows the growth of an uplink data transfer rate. 5G is also used for remote business of cloud. When a tactile interface is used, further lower end-to-end latency is required to maintain better user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use cases relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link with ultra reliability/low available latency, such as a self-driving vehicle. A level of reliability and latency is essential for smart grid control, industry automation, robot engineering, drone control and adjustment.

Multiple use cases are described in more detail below.

5G can supplement fiber-to-the-home (FTTH) and cable-based broadband (or DOCSIS) as means for providing a stream evaluated from several hundreds of megabits per second to gigabits per second. Such fast speed is required to deliver TV with a resolution of 4K or more (6K, 8K or more) in addition to virtual reality and augmented reality. Virtual reality (VR) and augmented reality (AR) applications include immersive sports games. A specific application program may require a special network configuration. For example, in VR games, in order for game companies to minimize latency, a core server may need to be integrated with the edge network server of a network operator.

An automotive is expected to be an important and new motive power in 5G, along with many use cases for the mobile communication of an vehicle. For example, entertainment for a passenger requires a high capacity and a high mobility mobile broadband at the same time. This reason is that future users continue to expect a high-quality connection regardless of their location and speed. Another use example of the automotive field is an augmented reality dashboard. The augmented reality dashboard overlaps and displays information, that identifies an object in the dark and notifies a driver of the distance and movement of the object, over a thing seen by the driver through a front window. In the future, a wireless module enables communication between vehicles, information exchange between a vehicle and a supported infrastructure, and information exchange between a vehicle and other connected devices (e.g., devices accompanied by a pedestrian). A safety system guides alternative courses of a behavior so that a driver can drive more safely, thereby reducing a danger of an accident. A next stage will be a remotely controlled or self-driven vehicle. This requires very reliable, very fast communication between different self-driven vehicles and between an automotive and infra. In the future, a self-driving vehicle can perform all driving activities, and a driver will focus on only abnormal traffics, which cannot be identified by a vehicle itself. Technical requirements of a self-driving vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. Similar configuration may be performed for each home. All of a temperature sensor, a window and heating controller, a burglar alarm and home appliances are wirelessly connected. Many of these sensors are typically a low data transfer rate, low energy and low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of suppliers and consumers, and thus the smart grid may improve the distribution of fuel, such as electricity, in an efficient, reliable, economical, production-sustainable and automated manner. The smart grid may be considered to be another sensor network with low latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, achieving the possibility requires that a radio connection operates with latency, reliability and capacity similar to those of the cable and that management is simplified. Low latency and a low error probability are new requirements for a connection to 5G.

Logistics and freight tracking is an important use case for mobile communication, which enables the tracking inventory and packages anywhere using a location-based information system. The logistics and freight tracking use case typically demands a low data speed, but requires a wide area and reliable location information.

Embodiments of the present disclosure to be described below can be implemented through the combination or the modification in order to meet the 5G requirements described above.

FIG. 1 illustrates a system to which the present disclosure is applicable.

Referring to FIG. 1, an AI system is connected to at least one of an AI server 16, a robot 11, a self-driving vehicle 12, an XR device 13, a smartphone 14 or home appliances 15 over a cloud network 10. In this case, the robot 11, the self-driving vehicle 12, the XR device 13, the smartphone 14 or the home appliances 15 to which the AI technology is applied may be called AI devices 11 to 15.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 11 to 16 constituting the AI system may be interconnected over the cloud network 10. Particularly, the devices 11 to 16 may communicate with each other through a base station, but may directly communicate with each other without the intervention of a base station.

The AI server 16 may include a server for performing AI processing and a server for performing calculation on big data.

The AI server 16 is connected to at least one of the robot 11, the self-driving vehicle 12, the XR device 13, the smartphone 14 or the home appliances 15, that are AI devices constituting the AI system, over the cloud network 10, and may help at least some of the AI processing of the connected AI devices 11 to 15.

In this instance, the AI server 16 may train an artificial neural network based on a machine learning algorithm instead of the AI devices 11 to 15, and may directly store a learning model or transmit the learning model to the AI devices 11 to 15.

The AI server 16 may receive input data from the AI devices 11 to 15, may deduce a result value of the received input data using the learning model, may generate a response or a control command based on the deduced result value, and may transmit the response or control command to the AI devices 11 to 15.

Alternatively, the AI devices 11 to 15 may directly deduce a result value of input data using a learning model, and may generate a response or a control command based on the deduced result value.

<AI+Robot>

An AI technology is applied to the robot 11, and the robot 11 may be implemented as a guide robot, a transport robot, a cleaning robot, a wearable robot, an entertainment robot, a pet robot, an unmanned flight robot, etc.

The robot 11 may include a robot control module for controlling an operation. The robot control module may mean a software module or a chip in which a software module is implemented using hardware.

The robot 11 may obtain state information of the robot 11, may detect (recognize) a surrounding environment and object, may generate map data, may determine a moving path and a running plan, may determine a response to a user interaction, or may determine an operation using sensor information obtained from various types of sensors.

The robot 11 may use sensor information obtained by at least one sensor of a lidar, a radar, and a camera in order to determine the moving path and running plan.

The robot 11 may perform the above operations using a learning model configured with at least one artificial neural network. For example, the robot 11 may recognize a surrounding environment and object using a learning model, and may determine an operation using recognized surrounding environment information or object information. In this case, the learning model may be directly trained in the robot 11 or may be trained in an external device, such as the AI server 16.

In this instance, the robot 11 may directly generate results using the learning model and perform an operation, but may perform an operation by transmitting sensor information to an external device, such as the AI server 16, and receiving results generated in response thereto.

The robot 11 may determine a moving path and running plan using at least one of map data, object information detected from sensor information, or object information obtained from an external device. The robot 11 may run along the determined moving path and running plan by controlling the driving unit.

The map data may include object identification information for various objects disposed in the space in which the robot 11 moves. For example, the map data may include object identification information for fixed objects, such as a wall and a door, and movable objects, such as a flowerpot and a desk. Furthermore, the object identification information may include a name, a type, a distance, a location, etc.

Furthermore, the robot 11 may perform an operation or run by controlling a driving unit based on a user's control/interaction. In this case, the robot 11 may obtain intention information of an interaction according to a user's behavior or voice utterance, may determine a response based on the obtained intention information, and may perform an operation.

<AI+Self-Driving>

An AI technology is applied to the self-driving vehicle 12, and the self-driving vehicle 12 may be implemented as a movable type robot, a vehicle, an unmanned flight body, etc.

The self-driving vehicle 12 may include a self-driving control module for controlling a self-driving function. The self-driving control module may mean a software module or a chip in which a software module has been implemented using hardware. The self-driving control module may be included in the self-driving vehicle 12 as an element of the self-driving vehicle 12, but may be configured as separate hardware outside the self-driving vehicle 12 and connected to the self-driving vehicle 12.

The self-driving vehicle 12 may obtain state information of the self-driving vehicle 12, may detect (recognize) a surrounding environment and object, may generate map data, may determine a moving path and running plan, or may determine an operation using sensor information obtained from various types of sensors.

In this case, in order to determine the moving path and running plan, like the robot 11, the self-driving vehicle 12 may use sensor information obtained from at least one sensor among LIDAR, a radar and a camera.

Particularly, the self-driving vehicle 12 may recognize an environment or object in an area whose view is blocked or an area of a given distance or more by receiving sensor information for the environment or object from external devices, or may directly receive recognized information for the environment or object from external devices.

The self-driving vehicle 12 may perform the above operations using a learning model configured with at least one artificial neural network. For example, the self-driving vehicle 12 may recognize a surrounding environment and object using a learning model, and may determine the flow of running using recognized surrounding environment information or object information. In this case, the learning model may have been directly trained in the self-driving vehicle 12 or may have been trained in an external device, such as the AI server 16.

In this case, the self-driving vehicle 12 may directly generate results using the learning model and perform an operation, but may perform an operation by transmitting sensor information to an external device, such as the AI server 16, and receiving results generated in response thereto.

The self-driving vehicle 12 may determine a moving path and running plan using at least one of map data, object information detected from sensor information or object information obtained from an external device. The self-driving vehicle 12 may run based on the determined moving path and running plan by controlling the driving unit.

The map data may include object identification information for various objects disposed in the space (e.g., road) in which the self-driving vehicle 12 runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 12 may perform an operation or may run by controlling the driving unit based on a user's control/interaction. In this case, the self-driving vehicle 12 may obtain intention information of an interaction according to a user' behavior or voice speaking, may determine a response based on the obtained intention information, and may perform an operation.

<AI+XR>

An AI technology is applied to the XR device 13, and the XR device 13 may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 13 may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 13 may output an XR object, including additional information for a recognized object, by making the XR object correspond to the corresponding recognized object.

The XR device 13 may perform the above operations using a learning model configured with at least one artificial neural network. For example, the XR device 13 may recognize a real object in three-dimensional point cloud data or image data using a learning model, and may provide information corresponding to the recognized real object. In this case, the learning model may have been directly trained in the XR device 13 or may have been trained in an external device, such as the AI server 16.

In this case, the XR device 13 may directly generate results using a learning model and perform an operation, but may perform an operation by transmitting sensor information to an external device, such as the AI server 16, and receiving results generated in response thereto.

<AI+Robot+Self-Driving>

An AI technology and a self-driving technology are applied to the robot 11, and the robot 11 may be implemented as a guide robot, a transport robot, a cleaning robot, a wearable robot, an entertainment robot, a pet robot, an unmanned flight robot, etc.

The robot 11 to which the AI technology and the self-driving technology have been applied may mean a robot itself having a self-driving function or may mean the robot 11 interacting with the self-driving vehicle 12.

The robot 11 having the self-driving function may collectively refer to devices that autonomously move along a given flow without control of a user or autonomously determine a flow and move.

The robot 11 and the self-driving vehicle 12 having the self-driving function may use a common sensing method in order to determine one or more of a moving path or a running plan. For example, the robot 11 and the self-driving vehicle 12 having the self-driving function may determine one or more of a moving path or a running plan using information sensed through LIDAR, a radar, a camera, etc.

The robot 11 interacting with the self-driving vehicle 12 is present separately from the self-driving vehicle 12, and may perform an operation associated with a self-driving function inside or outside the self-driving vehicle 12 or associated with a user got in the self-driving vehicle 12.

In this case, the robot 11 interacting with the self-driving vehicle 12 may control or assist the self-driving function of the self-driving vehicle 12 by obtaining sensor information in place of the self-driving vehicle 12 and providing the sensor information to the self-driving vehicle 12, or by obtaining sensor information, generating surrounding environment information or object information, and providing the surrounding environment information or object information to the self-driving vehicle 12.

Alternatively, the robot 11 interacting with the self-driving vehicle 12 may control the function of the self-driving vehicle 12 by monitoring a user got in the self-driving vehicle 12 or through an interaction with a user. For example, if a driver is determined to be a drowsiness state, the robot 11 may activate the self-driving function of the self-driving vehicle 12 or assist control of the driving unit of the self-driving vehicle 12. In this case, the function of the self-driving vehicle 12 controlled by the robot 11 may include a function provided by a navigation system or audio system provided within the self-driving vehicle 12, in addition to a self-driving function simply.

Alternatively, the robot 11 interacting with the self-driving vehicle 12 may provide information to the self-driving vehicle 12 or may assist a function outside the self-driving vehicle 12. For example, the robot 11 may provide the self-driving vehicle 12 with traffic information, including signal information, as in a smart traffic light, and may automatically connect an electric charger to a filling inlet through an interaction with the self-driving vehicle 12 as in the automatic electric charger of an electric vehicle.

<AI+Robot+XR>

An AI technology and an XR technology are applied to the robot 11, and the robot 11 may be implemented as a guide robot, a transport robot, a cleaning robot, a wearable robot, an entertainment robot, a pet robot, an unmanned flight robot, a drone, etc.

The robot 11 to which the XR technology has been applied may mean a robot, that is, a target of control/interaction within an XR image. In this case, the robot 11 is different from the XR device 13, and they may operate in conjunction with each other.

When the robot 11, that is, a target of control/interaction within an XR image, obtains sensor information from sensors including a camera, the robot 11 or the XR device 13 may generate an XR image based on the sensor information, and the XR device 13 may output the generated XR image. Furthermore, the robot 11 may operate based on a control signal received through the XR device 13 or a user's interaction.

For example, a user may identify a corresponding XR image at timing of the robot 11, remotely operating in conjunction through an external device, such as the XR device 13, may adjust the self-driving path of the robot 11 through an interaction, may control an operation or driving, or may identify information of a surrounding object.

<AI+Self-Driving+XR>

An AI technology and an XR technology are applied to the self-driving vehicle 12, and the self-driving vehicle 12 may be implemented as a movable type robot, a vehicle, an unmanned flight body, etc.

The self-driving vehicle 12 to which the XR technology has been applied may mean a self-driving vehicle equipped with means for providing an XR image or a self-driving vehicle, that is, a target of control/interaction within an XR image. Particularly, the self-driving vehicle 12, that is, a target of control/interaction within an XR image, is different from the XR device 13, and they may operate in conjunction with each other.

The self-driving vehicle 12 equipped with the means for providing an XR image may obtain sensor information from sensors including a camera, and may output an XR image generated based on the obtained sensor information. For example, the self-driving vehicle 12 includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 12, at least some of the XR object may be output so that it overlaps an object within a screen. For example, the self-driving vehicle 12 may output XR objects corresponding to objects, such as a carriageway, another vehicle, a traffic light, a signpost, a two-wheeled vehicle, a pedestrian, and a building.

When the self-driving vehicle 12, that is, a target of control/interaction within an XR image, obtains sensor information from sensors including a camera, the self-driving vehicle 12 or the XR device 13 may generate an XR image based on the sensor information. The XR device 13 may output the generated XR image. Furthermore, the self-driving vehicle 12 may operate based on a control signal received through an external device, such as the XR device 13, or a user's interaction.

[Extended Reality Technology]

Extended reality (XR) collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, while in the AR technology, a virtual object is used in a form to supplement a real object, in the MR technology, unlike in the AR technology, a virtual object and a real object are used as the same character.

The XR technology may be applied to a head-mount display (HMD), a head-up display (HUD), a cellular phone, a tablet PC, a laptop, a desktop, TV, a digital signage, etc. A device to which the XR technology has been applied may be referred to as an XR device.

FIG. 2 is a block diagram illustrating a mobile terminal related to the present disclosure.

Referring to FIG. 2, a mobile terminal 100 may include a wireless communication unit 110, an input unit 120, a sensing unit 140, an output unit 150, an interface unit 160, a memory 170, a controller 180, a power supply unit 190, and the like. It is understood that implementing all the components illustrated in FIG. 2 is not a requirement for the mobile terminal, and that the mobile terminal described in the present disclosure may alternatively be implemented by more or fewer components.

More specifically, the wireless communication unit 110 may include one or more modules which allow wireless communications between the mobile terminal 100 and a wireless communication system, between the mobile terminal 100 and another mobile terminal 100, or between the mobile terminal 100 and an external server. Further, the wireless communication unit 110 may include one or more modules which connect the mobile terminal 100 to one or more 5G networks.

The wireless communication unit 110 may include at least one of a broadcast receiving module 111, a mobile communication module 112, a wireless Internet module 113, a short-range communication module 114, or a location information module 115.

The input unit 120 may include a camera 121 which is one type of an image input unit for inputting an image signal, a microphone 122 which is one type of an audio input unit for inputting an audio signal, and a user input unit 123 (e.g., touch key, push key, mechanical key, etc.) for allowing a user to input information. Audio data or image data obtained by the input unit 120 may be analyzed and processed by user control commands.

The sensing unit 140 may include one or more sensors for sensing at least one of internal information of the mobile terminal, information about a surrounding environment of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a fingerprint sensor, a ultrasonic sensor, an optical sensor (e.g., camera 121), the microphone 122, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). The mobile terminal 100 described in the present disclosure may combine and utilize information obtained from two or more sensors of the sensing unit 140.

The output unit 150 may be configured to output various types of information related to audio, video, tactile output, and the like. The output unit 150 may include at least one of a display 151, an audio output unit 152, a haptic module 153, or an optical output unit 154. The display 151 may have an inter-layered structure or an integrated structure with a touch sensor to implement a touch screen. The touch screen may provide an output interface between the mobile terminal 100 and the user, as well as function as the user input unit 123 which provides an input interface between the mobile terminal 100 and the user.

The interface unit 160 serves as an interface with various types of external devices that are connected to the mobile terminal 100. The interface unit 160 may include at least one of wired/wireless headset ports, external charger ports, wired/wireless data ports, memory card ports, ports for connecting a device having an identification module, audio input/output (I/O) ports, video I/O ports, or earphone ports. The mobile terminal 100 may perform assorted control functions related to a connected external device, in response to the external device being connected to the interface unit 160.

The memory 170 stores data supporting various functions of the mobile terminal 100. For instance, the memory 170 may store multiple application programs or applications executed in the mobile terminal 100, data or instructions for operations of the mobile terminal 100, and the like. At least some of these application programs may be downloaded from an external server via wireless communication. Other application programs may be installed within the mobile terminal 100 at time of manufacturing or shipping, which is typically the case for basic functions (e.g., receiving a call, placing a call, receiving a message, sending a message, and the like) of the mobile terminal 100. It is common for application programs to be stored in the memory 170, installed on the mobile terminal 100, and executed by the controller 180 to perform an operation (or function) for the mobile terminal 100.

The controller 180 controls overall operation of the mobile terminal 100, in addition to the operations related to the application programs. The controller 180 may provide or process suitable information or functions to the user by processing signals, data, information and the like, which are input or output by the components mentioned above, or running application programs stored in the memory 170.

In addition, the controller 180 may control at least some of the components described above, in order to run the application programs stored in the memory 170. The controller 180 may also combine and operate at least two of the components included in the mobile terminal 100, in order to run the application programs.

The power supply unit 190 receives external power and internal power and supplies power to the respective components included in the mobile terminal 100 under the control of the controller 180. The power supply unit 190 may include a battery, and the battery may be configured to be embedded in the device body, or configured to be detachable from the device body.

At least some of the respective components may be combined with one another and operate, in order to implement the operation, the control, or the control method of the mobile terminal according to various embodiments described below. Further, the operation, the control, or the control method of the mobile terminal according to various embodiments may be implemented on the mobile terminal by an execution of at least one application program stored in the memory 170.

Regarding the wireless communication unit 110, the broadcast receiving module 111 of the wireless communication unit 110 receives broadcast signals and/or broadcast related information from an external broadcast management server via a broadcast channel. The broadcast channel may include a satellite channel, a terrestrial channel, etc. The two or more broadcast receiving modules 111 may be provided to the mobile terminal 100 for the simultaneous broadcast reception of at least two broadcast channels or the switching of broadcast channels.

The mobile communication module 112 exchanges radio signals with at least one of a base station, an external terminal, and a server on a mobile communication network constructed according to technical standards or communication methods for mobile communications (e.g., global system for mobile communication (GSM), code division multiple access (CDMA), CDMA 2000, EV-DO (Enhanced Voice-Data Optimized or Enhanced Voice-Data Only), Wideband CDMA (WCDMA), high speed downlink packet access (HSDPA), high speed uplink packet access (HSUPA), long term evolution (LTE), LTE-A (long term evolution-advanced), and the like).

Examples of the radio signals may include audio call signals, video call signals, or various formats of data according to the exchange of text/multimedia messages.

The wireless Internet module 113 is configured to facilitate wireless Internet access. The wireless Internet module 113 may be embedded in the mobile terminal 100 or externally coupled to the mobile terminal 100. The wireless Internet module 113 is configured to transmit and/or receive radio signals via communication networks according to wireless Internet technologies.

Examples of the wireless Internet technology include wireless LAN (WLAN), wireless fidelity (Wi-Fi), Wi-Fi Direct, digital living network alliance (DLNA), wireless broadband (WiBro), worldwide interoperability for microwave access (WiMAX), high speed downlink packet access (HSDPA), high speed uplink packet access (HSUPA), long term Evolution (LTE), LTE-A (Long Term Evolution-Advanced), and the like. The wireless Internet module 113 may transmit/receive data according to one or more of such wireless Internet technologies, and other Internet technologies as well.

From the viewpoint that the wireless Internet access according to WiBro, HSDPA, HSUPA, GSM, CDMA, WCDMA, LTE, LTE-A, and the like, is implemented via a mobile communication network, the wireless Internet module 113 performing the wireless Internet access via the mobile communication network may be understood as part of the mobile communication module 112.

The short-range communication module 114 is configured to facilitate short-range communications and can support short-range communications using at least one of Bluetooth™ radio frequency Identification (RFID), Infrared data association (IrDA), ultra-WideBand (UWB), ZigBee, near field communication (NFC), Wireless-Fidelity (Wi-Fi), Wi-Fi direct, and wireless USB (Wireless Universal Serial Bus) technologies. The short-range communication module 114 can support wireless communications between the mobile terminal 100 and a wireless communication system, between the mobile terminal 100 and another mobile terminal 100, or between the mobile terminal 100 and a network where another mobile terminal 100 (or an external server) is located, via wireless area networks. The wireless area networks may be wireless personal area networks.

In embodiments disclosed herein, another mobile terminal 100 may be a wearable device (e.g., a smart watch, a smart glass, or a head mounted display (HMD)) which is able to exchange data with the mobile terminal 100 according to the present disclosure. The short-range communication module 114 may sense (or recognize) the wearable device that is located around the mobile terminal 100 and can communicate with the mobile terminal 100. In addition, when the sensed wearable device is a device which is authenticated to communicate with the mobile terminal 100 according to the present disclosure, the controller 180 can transmit at least a part of data processed by the mobile terminal 100 to the wearable device via the short-range communication module 114. Thus, a user of the wearable device may use data processed by the mobile terminal 100 through the wearable device. For example, when a call is received at the mobile terminal 100, the user can answer the call using the wearable device. Also, when a message is received at the mobile terminal 100, the user can check the received message using the wearable device.

The location information module 115 is a module for obtaining a position (or a current position) of the mobile terminal. Representative examples of the location information module 115 include a global position system (GPS) module or a wireless fidelity (Wi-Fi) module. For example, if the mobile terminal utilizes a GPS module, a position of the mobile terminal can be acquired using a signal sent from a GPS satellite. As another example, if the mobile terminal utilizes the Wi-Fi module, a position of the mobile terminal can be acquired based on information related to a wireless access point (AP) which transmits or receives a radio signal to or from the Wi-Fi module. If necessary or desired, the location information module 115 may alternatively or additionally functions of the other modules of the wireless communication unit 110 to obtain data related to the position of the mobile terminal. The location information module 115 is a module used to obtain a position (or current position) of the mobile terminal and is not limited to a module that directly calculates or obtains the position of the mobile terminal.

Next, the input unit 120 is configured to input video information (or signal), audio information (or signal), data, or information input from the user. The mobile terminal 100 may include one camera 121 or a plurality of cameras 121 to input video information. The camera 121 processes image frames of still pictures or video obtained by an image sensor in a video call mode or a video recording mode. The processed image frames may be displayed on the display 151 or stored in the memory 170. The plurality of cameras 121 included in the mobile terminal 100 may be arranged to form a matrix structure, and various video information with various angles or focal points may be input to the mobile terminal 100 through the cameras 121 forming the matrix structure. Alternatively, the plurality of cameras 121 may be disposed in a stereoscopic structure to obtain left and right images for implementing a stereoscopic image.

The microphone 122 processes external audio signals into electrical voice data. The processed voice data can be variously utilized according to a function that is performing by the mobile terminal 100 (or an application program that is running on the mobile terminal 100). The microphone 122 can implement various noise removing algorithms for removing a noise generated in a process for receiving the external audio signals.

The user input unit 123 is a component that allows information input by a user. If information is input via the user input unit 123, the controller 180 can control an operation of the mobile terminal 100 in conformity with the input information. The user input unit 123 may include mechanical input means (or a mechanical key, for example, a button located on a front or rear surface or a side of the mobile terminal 100, a dome switch, a jog wheel, a jog switch, etc.) and touch input means. As one example, the touch input means may include a virtual key, a soft key, or a visual key which is displayed on a touch screen through software processing, or a touch key which is disposed on other portions of the mobile terminal except the touch screen. The virtual key or the visual key can be displayed on the touch screen in various shapes, for example, graphic, text, icon, video, or a combination thereof.

The sensing unit 140 senses at least one of internal information of the mobile terminal, surrounding environment information of the mobile terminal, and user information and generates a sensing signal corresponding to the sensed information. The controller 180 may control a drive or an operation of the mobile terminal 100 based on the sensing signal, or perform data processing, a function or an operation related to an application program installed in the mobile terminal 100 based on the sensing signal. The sensing unit 140 may be implemented using some various sensors, some of which will now be described in more detail.

The proximity sensor 141 refers to a sensor that senses presence or absence of an object approaching a predetermined detection surface or an object located around the predetermined detection surface, by using an electromagnetic force, infrared rays, or the like without a mechanical contact. The proximity sensor 141 may be disposed in an inner region of the mobile terminal covered by the touch screen described above or disposed around the touch screen.

Examples of the proximity sensor 141 include a transmissive photoelectric sensor, a direct reflective photoelectric sensor, a mirror reflective photoelectric sensor, a high-frequency oscillation proximity sensor, a capacitive proximity sensor, a magnetic proximity sensor, an infrared proximity sensor, and the like. When the touch screen is implemented as a capacitive touch sensor, the proximity sensor 141 may be configured to sense proximity of an object with conductivity using changes in an electromagnetic field which is responsive to an approach of the object with conductivity. In this instance, the touch screen (or the touch sensor) itself may be categorized as a proximity sensor.

For convenience of explanation, the term "proximity touch" refers to a scenario in which an object is proximate to the touch screen without contacting the touch screen and is recognized to be positioned on the touch screen, and the term "contact touch" refers to a scenario in which an object actually contacts the touch screen. A position corresponding to the proximity touch of the object relative to the touch screen corresponds to a position where the object is perpendicular to the touch screen upon the proximity touch of the object. The proximity sensor 141 can sense proximity touch and proximity touch patterns (e.g., a proximity touch distance, a proximity touch direction, a proximity touch speed, a proximity touch time, a proximity touch position, a proximity touch moving status, etc.). The controller 180 can process data (or information) corresponding to proximity touch operations and proximity touch patterns sensed by the proximity sensor 141, and also output visual information corresponding to the processed data on the touch screen. In addition, the controller 180 can control the mobile terminal 100 so that different operations or data (or information) are processed according to whether a touch of the same portion on the touch screen is either a proximity touch or a contact touch.

A touch sensor senses a touch (or a touch input) applied to the touch screen (or the display 151) using at least one of various touch methods including a resistive type, a capacitive type, an infrared type, an ultrasonic type, a magnetic field type, and the like.

As an example, the touch sensor may be configured to convert changes in a pressure applied to a specific part of the touch screen or changes in a capacitance occurring in a specific part of the touch screen into electrical input signals. The touch sensor may also be configured so that a touch object applying a touch input to the touch screen can sense a touched position or a touched area on the touch sensor, a touch pressure, a touch capacitance, or the like. In embodiments disclosed herein, the touch object is generally used to apply a touch input to the touch sensor. Examples of the touch object may include a finger, a touch pen, a stylus pen, a pointer, or the like.

When there is a touch input with respect to the touch sensor as described above, signal(s) corresponding to the touch input may be transmitted to a touch controller. The touch controller may process the received signal(s) and then transmit corresponding data to the controller 180. Thus, the controller 180 may sense which region of the display 151 has been touched. In embodiments disclosed herein, the touch controller may be configured separately from the controller 180, or may be the controller 180 itself.

The controller 180 may execute the same control or different controls in accordance with a kind of a touch object that touches the touch screen (or a touch key provided in addition to the touch screen). Whether to perform the same control or different controls in accordance with the kind of the touch object may be determined based on a current operating state of the mobile terminal 100 or an application program that is running.

The touch sensor and the proximity sensor described above may be individually implemented or combined to sense various types of touches with respect to the touch screen including a short (or tap) touch, a long touch, a multi-touch, a drag touch, a flick touch, a pinch-in touch, a pinch-out touch, a swipe touch, a hovering touch, and the like.

The ultrasonic sensor may recognize location information of a touch object using ultrasonic waves. The controller 180 can calculate a location of a wave generation source based on information sensed by an optical sensor and a plurality of ultrasonic sensors. The location of the wave generation source can be calculated using the fact that light is much faster than ultrasonic waves, namely, the time it takes for the light to reach the optical sensor is much shorter than the time it takes for the ultrasonic wave to reach the ultrasonic sensor. More specifically, the location of the wave generation source can be calculated using a difference in the reaching time described above between the light and the ultrasonic wave.

In the configuration of the input unit 120, the camera 121 includes at least one of a camera sensor (e.g., CCD, CMOS etc.), a photo sensor (or image sensors), and a laser sensor.

The camera 121 and a laser sensor may be combined and may sense a touch of a sensing object with respect to a 3D stereoscopic image. The photo sensor may be stacked on the display device. The photo sensor may be configured to scan a movement of the sensing object in proximity to the touch screen. More specifically, the photo sensor may mount photo diodes and transistors on rows/columns and scan contents mounted on the photo sensor using an electrical signal that changes depending on an amount of light applied to the photo diodes. That is, the photo sensor can calculate coordinates of the sensing object depending on a variation of light and obtain location information of the sensing object through the coordinates.

The display 151 displays (or outputs) information processed by the mobile terminal 100. For example, the display 151 may display execution screen information of an application program running on the mobile terminal 100 or display user interface (UI) information and graphic user interface (GUI) information in response to the execution screen information.

The display 151 displays (or outputs) information processed by the mobile terminal 100. For example, the display 151 may display execution screen information of an application program running on the mobile terminal 100 or display user interface (UI) information and graphic user interface (GUI) information in response to the execution screen information.

Further, the display 151 may be implemented as a stereoscopic display for displaying a stereoscopic image.

The stereoscopic display may employ a 3D display scheme such as a stereoscopic scheme (a glass scheme), an auto-stereoscopic scheme (glassless scheme), a projection scheme (holographic scheme), or the like.

The audio output unit 152 may output audio data, that is received from the wireless communication unit 110 or is stored in the memory 170, in a call signal reception mode, a call mode or a record mode, a voice recognition mode, a broadcast reception mode, and the like. The audio output unit 152 may output an audio signal related to a function (e.g., a call signal reception sound, a message reception sound, etc.) performed by the mobile terminal 100. The audio output unit 152 may also include a receiver, a speaker, a buzzer, or the like.

The haptic module 153 generates various tactile effects that the user can feel. A typical example of the tactile effect generated by the haptic module 153 may be a vibration. A strength, a pattern, etc. of the vibration generated by the haptic module 153 can be controlled by the selection of the user or setting of the controller. For example, the haptic module 153 may output different vibrations in a combination manner or a sequential manner.

In addition to the vibration, the haptic module 153 may generate various tactile effects including an effect by stimulation such as a pin arrangement moving vertically to a contact skin, a spray force or a suction force of air through a jet orifice or a suction opening, a touch of the skin, a contact of an electrode, and an electrostatic force, an effect by reproducing the sense of cold and warmth using an element that can absorb or generate heat, and the like.

The haptic module 153 may also be implemented to allow the user to feel a tactile effect through a muscle sensation such as the user's fingers or arm, as well as transferring the tactile effect through the direct contact. Two or more haptic modules 153 may be provided according to the particular configuration of the mobile terminal 100.

The optical output unit 154 outputs a signal for indicating an event generation using light of a light source of the mobile terminal 100. Examples of events generated in the mobile terminal 100 may include message reception, call signal reception, a missed call, an alarm, a schedule notice, an email reception, information reception through an application, and the like.

A signal output by the optical output unit 154 is implemented in such a manner that the mobile terminal 100 emits light or light with single color or a plurality of colors to a front surface or a rear surface. The signal output may be terminated as the mobile terminal senses that the user has checked the generated event.

The interface unit 160 serves as an interface for all of external devices connected to the mobile terminal 100. The interface unit 160 is configured to receive data from the external device, receive power to transfer the power to the respective components of the mobile terminal 100, or transmit internal data of the mobile terminal 100 to the external device. For example, the interface unit 160 may include wired or wireless headset ports, external charger ports, wired or wireless data ports, memory card ports, ports for connecting a device with an identification module, audio input/output (I/O) ports, video I/O ports, earphone ports, or the like.

The identification module may be a chip that stores various types of information for authenticating usage authority of the mobile terminal 100 and may include a user identity module (UIM), a subscriber identity module (SIM), a universal subscriber identity module (USIM), and the like. In addition, the device with the identification module (hereinafter referred to as "identification device") may be manufactured as a smart card. Thus, the identification device may be connected to the mobile terminal 100 via the interface unit 160.

When the mobile terminal 100 is connected to an external cradle, the interface unit 160 may serve as a passage to allow power from the cradle to be supplied to the mobile terminal 100 or a passage to allow various command signals input by the user from the cradle to be transferred to the mobile terminal. The various command signals or the power input from the cradle may operate as signals for recognizing that the mobile terminal 100 is properly mounted on the cradle.

The memory 170 may store programs for operations of the controller 180 and temporarily store input/output data (e.g., phonebook, messages, still images, videos, etc.). The memory 170 may store data about various patterns of vibration and audio which are output in response to a touch input on the touch screen.

The memory 170 may include at least one type of storage medium of a flash memory, a hard disk, a solid state disk (SSD), a silicon disk drive (SDD), a multimedia card micro type, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The mobile terminal 100 may also be operated in relation to a web storage that performs a storage function of the memory 170 over Internet.

As described above, the controller 180 typically controls operations related to application programs and the overall operations of the mobile terminal 100. For example, if a state of the mobile terminal 100 satisfies determined conditions, the controller 180 may execute or release a lock state for restricting an input of user's control command with respect to applications.

The controller 180 can perform control and processing related to voice call, data communication, video call, and the like, or perform pattern recognition processing capable of recognizing a handwriting input or a picture drawing input performed on the touch screen as characters or images, respectively. In addition, the controller 180 can control one or a combination of the abovementioned components in order to implement various embodiments disclosed herein through the mobile terminal 100.

The power supply unit 190 receives external power and internal power and supplies power necessary for operation of the respective components included in the mobile terminal 100 under the control of the controller 180. The power supply unit 190 may include a battery, and the battery may be an embedded rechargeable battery or be detachable from the terminal body for charging.

The power supply unit 190 may include a connection port. The connection port may be configured as an example of the interface unit 160 to which an external charger for supplying power to charge the battery is electrically connected.

As another example, the power supply unit 190 may be configured to charge the battery in a wireless manner without using the connection port. In this case, the power supply unit 190 may receive power from an external wireless power transmitter using one or more of an inductive coupling method based on a magnetic induction phenomenon or a magnetic resonance coupling method based on an electromagnetic resonance phenomenon.

The controller 180 may include an AR processor 185 in accordance with an embodiment of the present disclosure.

The AR processor 185 may recognize an object from an image obtained from the camera. The image may be a preview image. Alternatively, the image may include a streaming video received from the network. According to an embodiment of the present disclosure, the image may include an image in front of the vehicle, and the object may include a lane on the road, at least one object located on the road, an environment around the road, and the like. The AR processor 185 may overlap and display an augmented reality (AR) object related to the object with the image obtained from the camera.

FIG. 3 is a concept diagram illustrating a seamless navigation service described in the present disclosure.

Referring to FIG. 3, a navigation device may receive destination configuration information. The navigation device may include a mobile terminal 100 carried by a vehicle occupant and a navigation device provided inside a vehicle 200. The present disclosure will be described on the assumption that the navigation device is the mobile terminal 100.

Based on the destination configuration information input through the mobile terminal 100, the controller 180 may search for a route to a final destination. The controller 180 may provide a navigation service based on the searched route. The navigation service may be provided through a screen or voice output.

The navigation service provided through the mobile terminal 100 after getting on the vehicle may be provided through a display of the vehicle 200 or a navigation device included in the vehicle 200 (vehicle mode). If the vehicle 200 enters a specific building 10, the navigation service that was being provided before entering the specific building 10 may be continuously provided in accordance with an embodiment of the present disclosure.

Herein, continuously providing the navigation service may assume the case of entering a specific section on the route while receiving a route guide service to the destination. The specific section may mean a section in which a continuous route guide is impossible by map data stored by the navigation device.

For example, the mobile terminal 100 may store, in a memory, the map data for executing a navigation function. The navigation service means that route guide is possible based on the map data stored in the memory. Alternatively, the mobile terminal 100 may provide a navigation service based on map data provided in real time via a wireless network in addition to the map data stored in the memory. Both the map data stored in the memory of the mobile terminal 100 or the map data acquired via the network may be map data based on GPS location data. Thus, when the vehicle 200 or the mobile terminal 100 enters the specific section 10 (e.g., FIG. 3) in which the GPS location data is not detected, the navigation service may be temporarily stopped.

Hence, continuously providing the navigation service in the present disclosure may mean that, when it enters the specific section 10 (e.g., FIG. 3), it can be provided with a navigation service, that has been provided before entering the specific section, without interruption based on map data that can be provided in the specific section, not the map data based on the GPS location data.

A final destination may be an indoor building 20. GPS data for the final destination is merely location data of the indoor building 20 itself, and the user's final destination in the indoor building 20 may be a specific floor or a specific space within the specific floor. In this case, map data based on general GPS location data cannot provide detailed location coordinates of the specific floor or the specific space.

Accordingly, the present disclosure can change a navigation mode to provide a route guide service to the indoor building 20, more specifically, the user's specific final destination. For example, if a driver gets out of the vehicle while being provided with the navigation service in a car mode before getting off the vehicle, the driver can be provided with a navigation service which is extended from the navigation service, which has been provided through the mobile terminal 100, and is switched to a pedestrian mode.

FIG. 3 above schematically illustrated a seamless navigation service to be implemented in the present disclosure. Embodiments of the present disclosure are described in detail below.

FIG. 4 is a flow chart illustrating a method of providing a navigation service of a mobile terminal according to an embodiment of the present disclosure.

Referring to FIG. 4, the mobile terminal 100 may search for a route based on a destination input through the input unit, in S400.

The controller 180 may analyze the searched route. The route may generally be searched based on map data stored in the memory. However, search conditions may be changed according to a type of the destination while the destination input through the input unit searches the map data.

For example, if the destination is "Starbucks located at COEX in Samseong-dong", location information that can be recognized by the map data may be "Samseong-dong" and "COEX". In this case, the mobile terminal 100 may determine that it cannot search for an exact location (e.g., floor information, coordinate information on the corresponding floor, etc.) of the Starbucks store in the COEX building, and may output exact location information of the COEX building as coordinate information of a final destination.

If the mobile terminal 100 determines that it cannot search for detailed location information of the final destination, the mobile terminal 100 may determine that there is a section requiring a navigation mode change, in S410.

A method of determining whether there is at least one section requiring a navigation mode change may be variously configured.

For example, according to an embodiment of the present disclosure, the controller 180 may set the COEX building as a first destination, and request location information of Starbucks inside the COEX building from the network through the wireless communication unit. The network may be a cloud server. The mobile terminal 100 may receive location information about the final destination (Starbucks) from the network. The location information may include exact floor information of the Starbucks inside the COEX building, and 2D coordinate information on the corresponding floor.

The mobile terminal 100 may determine whether a route guide for the location information of the final destination received from the network is possible based on map data (e.g., SD map data) stored in the memory. That is, if the map data stored in the memory does not include the location information of the final destination received from the network, it may be determined that the route guide based on the map data is impossible. According to an embodiment, if it is determined that the location information received from the network cannot be recognized in the map data stored in the memory, it may be determined that there is a section requiring the navigation mode change, in S410.

In this case, the mobile terminal 100 may request predetermined map data providing a route guide for the location information through the wireless communication unit.

According to an embodiment, when the mobile terminal 100 determines whether there is at least one section requiring the navigation mode change, the mobile terminal 100 may consider section information between the last location that the vehicle can enter and the final destination. For example, the last location that the vehicle can enter may be the parking lot of the building. Hence, the mobile terminal 100 may determine whether the navigation mode change is necessary considering a route between last location information of the vehicle parked in the parking lot and the inside of the building where the final destination is located.

More specifically, the mobile terminal 100 cannot check, based on the map data stored in the memory, location information inside the parking lot and location information inside the building where the final destination is located. As described above, a reason why the mobile terminal 100 cannot check the location information is that there is no map data capable of detecting the location information.

Accordingly, if it is determined that the mobile terminal 100 cannot perfectly perform a detailed route guide for the final destination based on current map data, the mobile terminal 100 may determine that there is a section requiring the navigation mode change.

In other words, according to an embodiment of the present disclosure, if there is a need to convert map data necessary for a route guide, it is determined that there is at least one section requiring the navigation mode change.

In an embodiment, the mobile terminal 100 may set a detectable destination as a first destination based on first map data (e.g., SD map data) and set a detectable intermediate waypoint as a second destination based on second map data (e.g., parking lot map data). Furthermore, the mobile terminal 100 may set a detectable final destination as a third destination based on map data (third map data) inside the building where the final destination is located via the parking lot. When the first destination, the second destination, and the third destination are present, the mobile terminal 100 may determine that there is at least one section requiring the navigation mode change, in S410.

In an embodiment, the mobile terminal 100 may analyze the final route found in a route search process and determine that there is at least one section requiring the navigation mode change. In this case, before driving, map data corresponding to a section requiring the navigation mode change may be previously downloaded from the network.

In an embodiment, the mobile terminal 100 may determine in real-time whether there is at least one section requiring the navigation mode change through real-time communication with the network while performing a route guide according to the route search result, and request map data, that is applicable to a mode to be changed, from the network depending on a result of determination.

A method of determining whether there is at least one section requiring the navigation mode change is not limited to the above-described example, and can be variously changed and implemented depending on a type of the final destination, a network environment, a performance of the mobile terminal, and the like.

For example, if the type of the final destination is a type in which accurate route guide is possible only based on a plurality of different map data, map data may be downloaded using a section in which a network resource environment maintains a good state. If the type of the final destination is a type in which accurate route guide is possible based on one other type of map data in addition to SD map data, the map data may be downloaded through the route search process or the real-time communication with the network.

After the mobile terminal 100 determines whether there is at least one section requiring the navigation mode change, the mobile terminal 100 may provide a navigation service based on the first map data, in S420.

Herein, the first map data may be SD map data stored in the memory of the mobile terminal 100.

If it is determined that the mobile terminal 100 enters a navigation mode change section, the mobile terminal 100 may continuously provide, based on the second map data, a navigation service provided based on the first map data, in S430.

Providing the seamless navigation service depending on the navigation mode change may mean that the route guide service to the initially set destination can be seamlessly performed based on the second map data without an input of the same destination and the route search process even after navigation service based on the first map data ends FIG. 5 is a flow chart illustrating a method of providing a navigation service while changing a navigation mode in accordance with an embodiment of the present disclosure.

The navigation service described in the present disclosure may be provided through the vehicle or the mobile terminal, and the following is described on the assumption that a navigation function is executed in the mobile terminal.

Referring to FIG. 5, the mobile terminal 100 may search for a route to a destination based on input destination information, in S500. The mobile terminal 100 may check whether there is at least one section requiring a navigation mode change among the searched routes, in S510. The steps S500 and S510 may correspond to the steps S400 and S410 of FIG. 4 and may be replaced by the description of FIG. 4.

The following is described on the assumption that there is at least one section requiring the navigation mode change. At least one section requiring the navigation mode change among the searched routes may include a plurality of section including a first section, a second section, etc. The second section may be a section consecutive to the first section.

While driving, the mobile terminal 100 may determine whether to enter the first section among the searched routes, in S520.

For example, before entering the first section, the mobile terminal 100 may provide a navigation service based on SD map data stored in the memory. The first section may not be a section that can be identified by the SD map data. For example, first map data may be parking lot map data of a specific building.

As described above, the mobile terminal 100 may download the first map data corresponding to the first section from the network in the route search process. For example, if a distance between the mobile terminal 100 and the first section after the route search is less than a predetermined distance, the mobile terminal 100 may download the first map data from the network.

If the mobile terminal 100 determines that a location of the vehicle 200 enters the first section, the mobile terminal 100 may send a request signal of the first map data corresponding to the first section to the network, in S521. The mobile terminal 100 may receive the first map data from the network, in S523.

The mobile terminal 100 may perform a route guide based on the first map data, in S530.

The mobile terminal 100 provides the navigation service by detecting a location of the vehicle (a location of the mobile terminal) by GPS positioning technology and mapping it on the SD map data before entering the first section. However, if the mobile terminal 100 enters the first section, the mobile terminal 100 may search surroundings using the positioning technology, for example, simultaneous localization and mapping (SLAM) capable of measuring the location of the mobile terminal 100 in an indoor building to estimate a map and a current location of a corresponding space. Thus, the mobile terminal 100 can estimate the location of the vehicle in the first section, and at the same time map the first section (space inside the parking lot) through the SLAM with reference to the first map data received from the network.

In an embodiment, if it is determined that the mobile terminal 100 enters the first section, the mobile terminal 100 may perform a route guide function in the first section by simultaneously performing a localization in the first section and mapping for the surroundings of the first section using the SLAM positioning technology even if the mobile terminal 100 does not receive the first map data from the network.

In an embodiment, if it is determined that the mobile terminal 100 enters the first section, the mobile terminal 100 may combine a computer vision and a deep learning algorithm to estimate the location of the first section on a three-dimensional space, and at the same time may perform a route guide function in the first section through visual SLAM (simultaneous localization and mapping technology using visual information) for configuring a map collecting surrounding information into a virtual space.

In an embodiment, if it is determined that the mobile terminal 100 enters the first section, the mobile terminal 100 may transmit LiDAR data of the vehicle 200 to the network and receive map data on 3D space, that is generated more precisely, from the network using convolution neural network (CNN).

It may be determined the mobile terminal 100 passes through the first section and enters the second section, in S540.

For example, the second section may be an indoor building connected to the first section (parking lot). The mobile terminal 100 may request second map data corresponding to the second section from the network in S540, and may receive the second map data from the network in S543.

The mobile terminal 100 may perform a route guide service in the second section based on the second map data, in S550. The location of the mobile terminal 100 in the second section may be detected by a second positioning technology. If the second section is the indoor building, the location estimation operation and the mapping operation of the mobile terminal 100 can be simultaneously performed by the SLAM positioning technology, in the same manner as the first section.

FIG. 6 is an example diagram for illustrating a mode change requirement section in accordance with an embodiment of the present disclosure.

Referring to FIG. 6, the mobile terminal 100 or the vehicle 200 may divide a searched route into an external section Ro from the external road to the parking lot, a first section R1 of a parking lot section, and a second section R2 of an indoor building section, as a result of searching for a route based on an input final destination. In addition, for convenience of explanation, an embodiment of the present disclosure is described on the assumption that a place where the first section starts is a first destination (1), a place corresponding to a location where the vehicle is parked in the first section is a second destination (2), a place where the second section starts is a third destination (3), and the final destination is a fourth destination (4). A plurality of intermediate destinations on the route may correspond to places requiring the navigation mode change.

The mobile terminal 100 in the external section Ro may provide a navigation service based on general map data and a GPS location signal.

The first section R1 is an indoor space corresponding to the parking lot and may be divided into the first destination (1) that is a start point of the first section R1, a first shaded section between the first destination (1) and the second destination (2), and a second shaded section between the second destination (2) and the third destination (3). For example, the first shaded section may refer to a section from after the vehicle enters the parking lot entrance to a location where the vehicle is parked. The second shaded section may refer to a section from the location where the vehicle is parked to an indoor building entrance. Since the first section R1 is a parking section and no GPS signal is not detected in the first section R1, the mobile terminal 100 may download parking lot 3D map data from the network. Thus, the mobile terminal 100 requires a process of switching referenced map data in order to continuously provide the navigation service of the external section Ro even in the first section R1, and in an embodiment of the present disclosure, the parking lot 3D map data received from the network may be used for the route guide.

The second section R2 is an indoor space of a building connected to the parking lot, and 3D indoor map data of the building is required for a route guide service of the second section R2. The mobile terminal 100 may perform an operation of switching referenced map data to the 3D indoor map data of the building received from the network, in order to continuously provide the navigation service of the first section R1 even in the second section R2.

FIG. 7 illustrates an example of map data used in a mode change requirement section in accordance with an embodiment of the present disclosure.

Referring to FIG. 7, map data required for the route guide in the external section Ro of FIG. 6 may be SD map data. On the other hand, map data required for the route guide in the indoor space as in the first section R1 and the second section R2 may be 3D indoor map data. The 3D indoor map data may be data in which the plan configuration for each floor of the building and coordinate information of a specific area in the plan of each floor are respectively mapped. The mobile terminal 100 may refer to the 3D indoor map data, simultaneously perform the location estimation of the mobile terminal 100 in the indoor space and the map information generation through 3D SLAM positioning, and provide the route guide service to the final destination using this result.

FIG. 8 is a concept diagram illustrating a seamless navigation service using a mobile terminal in accordance with an embodiment of the present disclosure. Hereinafter, an embodiment of the present disclosure may refer to the description of FIG. 6.

Referring to FIG. 8, the mobile terminal 100 may provide a navigation service based on SD map data for the external section Ro between a departure and the first destination (1) (mobile terminal mode). The mobile terminal 100 may provide a navigation service through a method of mirroring a navigation screen output from the mobile terminal 100 for a navigation device included in the vehicle 200 or at least one display included in the vehicle (vehicle mode).

When the mobile terminal 100 enters the parking lot entrance (first destination), the mobile terminal 100 enters a shaded region in which the navigation function of the mobile terminal and the navigation function of the vehicle are executed inside the parking lot. The mobile terminal 100 may receive parking lot 3D map data from the network and obtain location information of the mobile terminal based on the SLAM positioning technology. The vehicle 200 may map location information of a specific space (second destination) inside the parking lot to the parking lot 3D map data and may store it. When the mobile terminal 100 detects whether the vehicle 200 is parked based on vehicle sensor data (e.g., speed data, start-off data), the mobile terminal 100 may receive an alarm message indicating that the navigation mode is switched to the pedestrian mode.

When the navigation mode is switched to the pedestrian mode, the mobile terminal 100 may provide a route guide service from the parking location (second destination) to a building entrance (third destination). As described above, in the pedestrian mode, the mobile terminal 100 may estimate the location of the mobile terminal 100 inside the parking lot based on the parking lot 3D map data and the SLAM positioning technology.

In a state in which the navigation mode is the pedestrian mode, when the location of the mobile terminal 100 approaches the building entrance (third destination), the mobile terminal 100 may receive an alarm message notifying the arrival of the building entrance and whether to provide a building indoor route guide service. The mobile terminal 100 may estimate the location of the mobile terminal 100 inside the building based on the building indoor 3D map data and the SLAM positioning technology, and hence may provide the route guide service to the final destination.

FIGS. 9 and 10 are example diagrams for setting a navigation service using a mobile terminal in accordance with an embodiment of the present disclosure.

Referring to FIG. 9, according to an embodiment of the present disclosure, if the mobile terminal 100 receives a destination, the mobile terminal 100 may provide additional service items available. The additional service items may include "Guide to parking lot entrance", "Guide to parking space", and "Guide to indoor walking" menus. Since all the respective items are not provided by the general navigation service, the items may be processed as a paid service. When the user of the mobile terminal 100 is using a paid service for all the above three items, all the three items may be activated and provided.

The mobile terminal 100 may determine whether there is at least one section in which, as a result of searching for the route to the destination based on the input destination information and the selected additional service use item, the additional service item can be provided on the searched route. The mobile terminal 100 may summarizes navigation information (1) of the first section, navigation information (2) of the second section, and navigation information (3, 4) of the third and fourth sections before starting the route guide and may provide them through the display or the audio output unit.

FIGS. 11 and 12 illustrate an example of providing an AR navigation screen in accordance with an embodiment of the present disclosure.

The navigation service described in the present disclosure may provide an AR navigation service. FIGS. 11 and 12 illustrate a method of acquiring a camera image and an output location of an AR navigation screen for providing the AR navigation service.

An AR processor maps an image in front of the vehicle to AR information and generates an AR navigation screen, in order to provide the AR navigation service. The image of the front of the vehicle may be obtained through a camera. The camera may include at least one camera (e.g., a black box image) included in the vehicle. The image may be an image obtained from the camera of the mobile terminal 100.

(a) of FIG. 11 illustrates that the front image is obtained through the camera included in the vehicle and is transmitted to the mobile terminal 100, and the AR processor included in the mobile terminal 100 generates AR information. The AR information may include lane detection, and a rendering element of a road based on the detected lane as AR graphics. An AR navigation image in which the AR information is mapped to the camera image may be encoded and transmitted to a display (navigation display) of the vehicle. The display of the vehicle may decode the encoded image and display an AR navigation screen 1110.

According to an embodiment, the AR navigation screen 1110 provided in the mobile terminal 100 may be displayed on the vehicle display in the mirroring method.

As illustrated in (b) of FIG. 11, when the camera of the vehicle itself is not available, the front image is obtained through the camera of the mobile terminal 100, and the mobile terminal 100 may generate the AR navigation screen 1110 through the above-described AR processing.

FIGS. 12A to 12D illustrate an example of selecting a display to output a camera source and an AR navigation screen.

Referring to FIG. 12A, the mobile terminal 100 may be wiredly connected to the vehicle 200 via a USB (e.g., USB 3.1 data protocol). The camera image may be obtained through a black box of the vehicle 200. The mobile terminal 100 may receive a streaming video obtained by a black box camera through a wireless communication unit (e.g., WiFi). The mobile terminal 100 may perform AR processing and output an AR navigation screen through the display of the vehicle 200 (e.g., a navigation device included in the vehicle).

FIG. 12B illustrates that the mobile terminal 100 is not connected to the vehicle 200. The camera image may receive the black box camera image through the wireless communication unit, and the mobile terminal 100 may perform AR processing and output the generated AR navigation screen on the display of the mobile terminal 100.

FIG. 12C illustrates that the camera image is received from the network. The mobile terminal 100 may be wiredly connected to the vehicle 200 via a USB (e.g., USB 3.1 data protocol). The mobile terminal 100 transmits, to the network, vehicle sensing information such as a location of the own vehicle, a GPS value, and a speed. The mobile terminal 100 may receive a driving video streaming from the network through the wireless communication unit. The mobile terminal 100 may perform the AR processing on the image received from the network to generate the AR navigation image and may output the generated AR navigation screen on the display of the vehicle 200 that is wiredly connected to the mobile terminal 100.

FIG. 12D illustrates that the camera image is obtained by the mobile terminal 100. The mobile terminal 100 may obtain a front image through the camera and perform the AR processing on the obtained image to output the generated AR navigation screen on the display.

FIGS. 13 to 15 illustrate a method of providing a navigation service using a mobile terminal in accordance with an embodiment of the present disclosure when a vehicle enters the parking lot as illustrated in FIG. 8. A navigation service in which the vehicle 200 arrives at the parking lot and is guided to a parking space is described below.

Referring to FIG. 13, the mobile terminal 100 may check a location of the vehicle through the GPS positioning method, in S1300. In this instance, GPS location data may be received from the network in real time. Before entering the first section, the vehicle 200 is provided with a navigation service based on general map data.

The mobile terminal 100 may calculate a GPS distance between a starting point of a first section (parking lot) and the current vehicle 200, in S1310.

When the distance between the vehicle and the starting point of the first section is less than a predetermined distance in order to prepare map data required for navigation route guide of the first section before arriving at the starting point of the first section, the mobile terminal 100 checks that the vehicle enters the first section, in S1320.

The mobile terminal 100 may download a 3D map of the first section (parking lot) from the network (server), in S1330.

The mobile terminal 100 may check a location of the vehicle on the 3D map through the 3D SLAM positioning method, in S1340. In this instance, the mobile terminal 100 may detect a current location of the vehicle on the 3D map of the first section (parking lot) using a camera image received from the network (server).

When the vehicle enters the first section (parking lot), if it is registered in a parking guide service (it may be a paid service), the mobile terminal 100 may receive 3D coordinate information of an available parking space from the network (server). Hence, the mobile terminal 100 may check location information of a specific area (location of the available parking space) inside the first section (parking lot), in S1350. The mobile terminal 100 may perform the route guide to the specific area (available parking space) by extending the navigation guide that has been provided before entering the first section. Hence, even if the vehicle enters the room from the outside, the seamless navigation service may be provided without interruption of route guide to the final destination.

Referring to FIG. 14, when the GPS distance between the vehicle 200 and an entrance of the first section (parking lot) is less than a predetermined distance, the mobile terminal 100 may download parking lot map data from the server through the wireless communication unit.

Referring to FIG. 15, if the vehicle 200 enters the inside of the first section (parking lot), the mobile terminal 100 may receive 3D coordinate information of an available parking space from the server. The mobile terminal 100 may perform a navigation service in the parking lot by mapping 3D coordinates of the available parking space to parking lot 3D map data received from the server.

FIGS. 16 and 17 illustrate a method of providing a navigation service using a mobile terminal in accordance with an embodiment of the present disclosure when a vehicle enters an indoor building as illustrated in FIG. 8.

Referring to FIG. 16, when the vehicle 200 is parked in the above-described available parking space and then turns off the ignition, the mobile terminal 100 may check that the vehicle 200 is in an ignition-off state by receiving ignition-off state information from a vehicle network, in S1600.

If the mobile terminal 100 checks that the vehicle 200 is in the ignition-off state, the mobile terminal 100 may transmit the ignition state of the vehicle to the network, in S1601.

The mobile terminal 100 may check a parking location of the vehicle (3D coordinate information) and transmit it to the network, in S1610 and S1611.

The network may receive ignition state information and parking location information of the vehicle and send a message notifying a navigation mode change to the mobile terminal 100, in S1620. The navigation mode change may mean that a driver is provided with the navigation service through the mobile terminal after getting out of the vehicle.

When the mobile terminal 100 checks that the pedestrian mode is executed in response to the message received from the network, the mobile terminal 100 may be configured so that the navigation function is executed in the pedestrian mode, in 51630.

The mobile terminal 100 may output, on the display of the mobile terminal, an AR navigation screen including AR information for guiding that it enters the second section (building) as the pedestrian mode is executed, in S1640.

The mobile terminal 100 may check whether it enters the second section based on a 3D distance between the second section (building) and the mobile terminal 100, in S1650.

The mobile terminal 100 may download 3D map data of the second section (indoor) from the network, in S1660. The mobile terminal 100 may execute an indoor pedestrian navigation function by estimating a location indoors through a 3D SLAM positioning method and mapping the estimated location to the indoor 3D map data, in S1670.

Referring to FIG. 17, the mobile terminal 100 may display AR information on the navigation screen in the process of executing the navigation pedestrian mode.

The AR information may display, on the navigation screen, a route guide indicator (e.g., 3D coordinate information (3DC), rendering graphic element (ARP)) for guiding a route to the entrance of the second section (building). If a direction that the mobile terminal 100 faces is different from the destination, the mobile terminal 100 may add a direction indicator BI1 on the screen. For example, when there is a difference of a predetermined angle in the left direction with respect to the destination direction, the mobile terminal 100 may display, in the right direction of the display, an arrow indicator BI1 for indicating that the destination exists in the right direction.

If it enters the second section (building) in a state in which the navigation pedestrian mode is executed, a route guide service to a final destination may be performed. For example, a guide message, such as "Enter the entrance indicated on the screen" and "Take the elevator and get off on the 3rd floor", may be output.

FIG. 18 illustrates an output of a navigation screen according to a navigation service using a mobile terminal considering sensing information in accordance with an embodiment of the present disclosure.

Referring to FIG. 18, an embodiment described in the present disclosure may provide an AR navigation screen by dividing it into a car mode and a pedestrian mode. In a searched route in accordance with an embodiment, different map data may be used for each section requiring a switch of map data.

According to an embodiment, the mobile terminal 100 enters an external section Ro and a first section R1 and may output a navigation screen through at least one display of the vehicle until a second destination (2). The mobile terminal 100 may output the navigation screen on the display of the mobile terminal 100 until a final destination (fourth destination) after getting out of a parking location place (a second destination) in the first section R1 (parking lot).

According to an embodiment, the mobile terminal 100 provides the navigation service in the external section Ro using SD map data. The mobile terminal 100 provides the navigation service in the first section R1 and a second section R2 using parking space 3D map data, building indoor 3D map data, and the like.

According to an embodiment, the mobile terminal 100 performs the positioning in the external section Ro based on GPS, but may perform the positioning of the indoor space in the first section R1 and the second section R2 based on SLAM.

According to an embodiment, an embodiment of the present disclosure may classify the searched route into a section that the vehicle can enter and a section that no vehicle can enter. Since the section that the vehicle can enter, for example, the external section Ro and the second destination (parking location) of the first section R1 (parking lot) are sections in which the vehicle can be driven, the mobile terminal 100 may acquire vehicle sensing data via the vehicle network. For example, the vehicle sensing data may include vehicle speed, yaw rate, gear position (P, N, D, R), and blinking status (Left, Right). The mobile terminal 100 may control the AR navigation output based on the vehicle sensing data. For example, when the vehicle is switched from a driving state to a parking state, it may be configured so that a location of the AR navigation screen is switched from the vehicle to the mobile terminal. When an output location of the AR navigation screen is switched to the mobile terminal, the AR navigation screen may be output using sensing data (e.g., IMU angle (roll, pitch, yaw) information, mobile built-in camera image, etc.) obtained from at least one sensor included in the mobile terminal.

According to an embodiment, in order to provide the AR navigation function, the mobile terminal 100 may enter the external section Ro and the first section R1 and may use an image obtained from the camera included in the vehicle to configure the AR navigation screen until the second destination (2). The mobile terminal 100 may use an image obtained from the camera of the user terminal in the final destination (fourth destination) after getting out of the parking location place (second destination) in the first section R1 (parking lot).

The present disclosure may comprise the following embodiments.

Embodiment 1: a method of providing a navigation service in a mobile terminal comprises searching for a route to a destination; determining whether there is at least one mode change section requiring a change of a navigation mode among the searched route; and when it is determined that it enters the mode change section, changing map data underlying a route guide from first map data to second map data to continuously provide the navigation service in the changed navigation mode.

Embodiment 2: according to the embodiment 1, determining whether there is at least one mode change section comprises determining whether there is, among the searched route, at least one section requiring the route guide based on the map data configured through different positioning methods.

Embodiment 3: according to the embodiment 2, the map data includes at least one of map data configured through a GPS positioning technology and map data configured through a SLAM positioning technology.

Embodiment 4: according to the embodiment 2, the method further comprises, when it is determined that it enters a first section of the at least one section while providing the navigation service based on the first map data, guiding a route to the destination based on the second map data without a resetting operation of the destination.

Embodiment 5: according to the embodiment 4, the method further comprises, when a distance between a current location of the mobile terminal and a starting point of the first section is less than or equal to a predetermined distance, determining that it enters the first section.

Embodiment 6: according to the embodiment 4, the first map data is map data configured through a GPS positioning technology, and the method further comprises, when a current location of the mobile terminal enters the first section, downloading the second map data through a wireless communication unit.

Embodiment 7: according to the embodiment 6, the method further comprises, when the current location of the mobile terminal and a starting point of the first section enter within a predetermined distance, determining that it enters the first section.

Embodiment 8: according to the embodiment 1, the navigation mode includes at least one of a first mode in which a navigation screen is provided through at least one vehicle display, and a second mode in which the navigation screen is provided through a display of the mobile terminal.

Embodiment 9: according to the embodiment 8, when a predetermined condition is satisfied, the first mode is switched to the second mode, or the second mode is switched to the first mode, and in a state in which the navigation service is continuously performed, a switch between the first mode and the second mode is performed.

Embodiment 10: according to the embodiment 8, a predetermined condition is determined by a combination of at least one of vehicle sensor data and sensor data of the mobile terminal, and the method further comprises determining whether a vehicle is stopped, and whether the mobile terminal moves inside or outside the vehicle while the vehicle is stopped.

Embodiment 11: according to the embodiment 8, the first mode provides the navigation screen displayed on the mobile terminal on the vehicle display as a mirroring screen.

Embodiment 12: according to the embodiment 1, the method further comprises determining that it enters the mode change section based on at least one of vehicle sensor data or sensor data of the mobile terminal received through a wireless communication unit.

Embodiment 13: according to the embodiment 1, the method further comprises obtaining an image for configuring a navigation screen through at least one camera; generating an AR image by mapping AR information to the image; and providing the navigation service in an AR mode.

Embodiment 14: according to the embodiment 13, the camera includes at least one of at least one camera included in the mobile terminal and at least one camera included in a vehicle.

Embodiment 15: according to the embodiment 11, an image includes a driving streaming video received from a network through a wireless communication unit.

Embodiment 16: according to the embodiment 1, the first map data is map data stored in a memory of the mobile terminal, and the second map data is map data for providing the navigation service in an indoor space.

Embodiment 17: according to the embodiment 1, the method further comprises, when the destination is input, displaying, on a display, an available service menu according to the change of the navigation mode; and providing navigation service summary information for each mode change section.

Embodiment 18: a mobile terminal comprises a wireless communication unit; a memory configured to store map data; an input unit configured to receive a destination; and a processor configured to search for a route to the destination, determine whether there is at least one mode change section requiring a change of a navigation mode among the searched route, and when it is determined that it enters the mode change section, change map data underlying a route guide from first map data to second map data to continuously provide the navigation service in the changed navigation mode.

Embodiment 19: according to the embodiment 18, the processor is further configured to determine whether there is, among the searched route, at least one section requiring the route guide based on the map data configured through different positioning methods.

Embodiment 20: according to the embodiment 19, the map data includes at least one of map data configured through a GPS positioning technology and map data configured through a SLAM positioning technology.

Embodiment 21: according to the embodiment 19, the processor is further configured to, when it is determined that it enters a first section of the at least one section while providing the navigation service based on the first map data, guide a route to the destination based on the second map data without a resetting operation of the destination.

Embodiment 22: according to the embodiment 21, the processor is further configured to, when a distance between a current location of the mobile terminal and a starting point of the first section is less than or equal to a predetermined distance, determine that it enters the first section.

Embodiment 23: according to the embodiment 21, the first map data is map data configured through a GPS positioning technology, and the processor is further configured to, when a current location of the mobile terminal enters the first section, download the second map data through a wireless communication unit.

Embodiment 24: according to the embodiment 18, the navigation mode includes at least one of a first mode in which a navigation screen is provided through at least one vehicle display, and a second mode in which the navigation screen is provided through a display of the mobile terminal.

Embodiment 25: according to the embodiment 24, when a predetermined condition is satisfied, the navigation mode is configured so that the first mode is switched to the second mode or the second mode is switched to the first mode, and in a state in which the navigation service is continuously performed, a switch between the first mode and the second mode is performed.

Embodiment 26: according to the embodiment 24, the predetermined condition is determined by a combination of at least one of vehicle sensor data and sensor data of the mobile terminal, and the processor is further configured to determine whether a vehicle is stopped, and whether there is a movement of the mobile terminal to the inside or outside of the vehicle while the vehicle is stopped.

Embodiment 27: according to the embodiment 24, the processor is further configured to, in the first mode, provide the navigation screen displayed on the mobile terminal on the vehicle display as a mirroring screen.

Embodiment 28: according to the embodiment 18, the processor is further configured to determine that it enters the mode change section based on at least one of vehicle sensor data or sensor data of the mobile terminal received through the wireless communication unit.

Embodiment 29: according to the embodiment 18, the mobile terminal further comprises an AR processor configured to generate an AR image by mapping AR information to the image obtained through the camera, and the processor is further configured to provide the navigation service in an AR mode.

Embodiment 30: according to the embodiment 29, the image includes at least one of an image obtained by at least one camera included in the vehicle through the wireless communication unit and a driving streaming video received from the network through the wireless communication unit.

Embodiment 31: according to the embodiment 18, the first map data is map data stored in the memory, and the second map data is map data for providing the navigation service in an indoor space.

Embodiment 32: according to the embodiment 18, the processor is further configured to, when the destination is input through the input unit, display, on a display, an available service menu according to the change of the navigation mode, and provide navigation service summary information for each mode change section.

The present disclosure described above can be implemented using computer-readable media with programs recorded thereon for execution. The computer-readable media include all kinds of recording devices capable of storing data that is readable by a computer system. Examples of the computer-readable media include hard disk drive (HDD), solid state disk (SSD), silicon disk drive (SDD), ROM, RAM, CD-ROM, a magnetic tape, a floppy disk, and an optical data storage device, other types of storage media presented herein, etc. If desired, the computer-readable media may be implemented in the form of a carrier wave (e.g., transmission over Internet). Accordingly, the detailed description should not be construed as limiting in all aspects and should be considered as illustrative. The scope of the present disclosure should be determined by rational interpretation of the appended claims, and all modifications within an equivalent scope of the present disclosure are included in the scope of the present disclosure.

The invention claimed is:

1. A mobile terminal comprising:
a wireless communication unit;
a memory configured to store map data;
an input unit configured to receive a destination; and
a processor configured to:
search for a route to the destination;
determine whether at least one mode change section requiring a change of a navigation mode among the searched route exist, including:
determine, among the searched route, whether at least one section requiring a route guide based on the map data configured through different positioning methods;
based on a determination of entry into the mode change section, change map data underlying the route guide from first map data to second map data to continuously provide a navigation service in the changed navigation mode;
based on a determination of entry into a first section of the at least one section within the at least one section while providing the navigation service according to the first map data, guide the route to the destination according to the second map data without requiring a destination reset operation;
based on a current location of the mobile terminal entering the first section, download the second map data through a wireless communication unit; and
determine whether (i) a vehicle is stopped and (ii) there is a movement of the mobile terminal either entering or exiting the vehicle while the vehicle is stopped,
wherein the first map data is map data configured through a global position system (GPS) positioning technology,
wherein the navigation mode includes at least one of a first mode in which a navigation screen is provided through at least one vehicle display or a second mode in which the navigation screen is provided through a display of the mobile terminal,
wherein, based on a predetermined condition being satisfied, the first mode is switched to the second mode or the second mode is switched to the first mode,
wherein, in a state in which the navigation service is continuously performed, a switch between the first mode and the second mode is performed, and
wherein the predetermined condition is determined by a combination of at least one of vehicle sensor data or sensor data of the mobile terminal.

2. The mobile terminal of claim 1, wherein the map data includes at least one of map data configured through the GPS positioning technology or map data configured through a simultaneous localization and mapping (SLAM) positioning technology.

* * * * *